United States Patent

Ohtani et al.

[11] Patent Number: 6,157,973
[45] Date of Patent: Dec. 5, 2000

[54] MICROCOMPUTER HAVING MEMORY AND PROCESSOR FORMED ON THE SAME CHIP TO INCREASE THE RATE OF INFORMATION TRANSFER

[75] Inventors: Jun Ohtani; Naoto Okumura; Akira Yamazaki, all of Hyogo, Japan

[73] Assignee: Mitsubishi Denki Kabushiki Kaisha, Tokyo, Japan

[21] Appl. No.: 09/226,195

[22] Filed: Jan. 7, 1999

[30] Foreign Application Priority Data

Oct. 24, 1996 [WO] WIPO ..................... PCT/JP96/03103

[51] Int. Cl.[7] ..................................................... G06F 13/00
[52] U.S. Cl. ......................... 710/100; 710/128; 710/129; 710/130; 712/33; 712/38
[58] Field of Search ..................................... 710/100–101, 710/104, 105, 110, 127, 128, 129, 130, 131, 261, 126; 712/411, 32, 33, 35, 36, 34–38; 701/99, 100–101, 104–105; 718/127–130, 261

[56] References Cited

U.S. PATENT DOCUMENTS

| | | | |
|---|---|---|---|
| 4,296,469 | 10/1981 | Gunter | 710/128 |
| 5,264,746 | 11/1993 | Ohmae | 714/700 |
| 5,287,527 | 2/1994 | Delp et al. | 365/230.01 |
| 5,321,845 | 6/1994 | Sawase | 364/232.8 |
| 5,638,272 | 6/1997 | Minowa | 701/114 |
| 5,774,684 | 6/1998 | Haines | 710/126 |
| 5,784,637 | 7/1998 | Sawase | 712/37 |
| 5,809,319 | 9/1998 | Kim | 712/245 |
| 5,826,100 | 10/1998 | Bonet | 712/221 |

FOREIGN PATENT DOCUMENTS

| | | |
|---|---|---|
| 57-111733 | 7/1982 | Japan . |
| 57-11733 | 7/1982 | Japan . |
| 3-135640 | 6/1991 | Japan . |
| 5-502125 | 4/1993 | Japan . |
| 6-267274 | 9/1994 | Japan . |
| 7-040794 | 2/1995 | Japan . |
| WO 91/02311 | 2/1991 | WIPO . |

Primary Examiner—John A. Follansbee
Assistant Examiner—Stacy Whitmore
Attorney, Agent, or Firm—Burns, Doane, Swecker & Mathis, LLP

[57] ABSTRACT

A first memory of a large storage capacity is connected to a DQ pad for inputting and outputting an information signal through a bus interface unit. A first bidirectional transfer circuit and a second bidirectional transfer circuit for bidirectionally transmitting an information signal are provided between a high-speed memory and the memory of the large storage capacity. The first bidirectional transfer circuit is connected with the large storage capacity memory through a common bus, and the high-speed memory is interconnected with the second transfer circuit through a fifth bus. This second bidirectional transfer circuit is connected to an instruction register and a data register through a sixth bus. A processor is arranged in proximity to this instruction register and the data register, so that the processor processes an instruction from the instruction register and data from the data register and stores a processing result in the data register again. The bus interface unit is interconnected with the DQ pad through a first bus, and interconnected with the mass storage capacity memory through the second bus. The first and second bidirectional transfer circuits are interconnected with each other through a fourth bus. By arranging the respective buses independently of each other respectively, the processor can execute processing internally through an available bus during information signal transmission in an exterior.

19 Claims, 21 Drawing Sheets

IDENTICAL IN ALL DRIVER CIRCUITS

MICROCOMPUTER HAVING MEMORY AND PROCESSOR FORMED ON THE SAME CHIP TO INCREASE THE RATE OF INFORMATION TRANSFER

This application claims priority under 35 U.S.C. §119 from International Application PCT/JP96/03103 with an international filing date of Oct. 24, 1996, now abandoned.

BACKGROUND OF THE INVENTION

1. Field of the Invention

The present invention relates to a microcomputer having a processor and a memory formed on the same chip, and more particularly, it relates to the layout of a processor and a memory as well as a transfer unit for performing data transfer between these processor and memory.

2. Description of the Background Art

FIG. 1 is a diagram schematically showing an exemplary structure of a conventional processing system. Referring to FIG. 1, the processing system includes a processor 1 performing required arithmetic and logic processing operations, and a main memory 1 provided in the exterior of the processor 1 and serving as a main storage for this processor 1. The processor 1 is connected to the main memory 2 through an external data bus 3. This main memory 2 stores instructions and processed or pre-processed data (hereinafter both are referred to as information).

The processor 1 includes a cache memory 1a for storing information, a controller 1b forming various control signals in accordance with the information stored in this cache memory 1a, a register group 1c for temporarily storing data required for arithmetic and logic processing, and an arithmetic unit 1d performing required operations in accordance with the control signals from the controller 1d. The cache memory 1a, the controller 1b, the register group 1c and the arithmetic unit 1d are interconnected with each other through an internal data bus 1e. This internal data bus 1e is connected to the external data bus 3 through an interface 1f. The interface 1f manages data transfer between the main memory 2, the cache memory 1a and the controller 1b under control of this controller 1b.

When the controller 1b requires information which is not stored in the cache memory 1a in the structure of this processing system shown in FIG. 1, the information required by this controller 1b is transferred from the main memory 2 through the external data bus 3 and the interface 1f.

The main memory 2, which is formed by a DRAM (dynamic random access memory) of a large storage capacity, for example, cannot operate at such a high speed as the processor 1. The speed of data transfer between the main memory 2 and the processor 1 is determined by the bus width (bit width) of the external data bus 3. The bus width of the external data bus 3 is determined by the number of data input/output terminals of the main memory 2. Thus, there arises such a problem that the data transfer between the main memory 2 and the processor 1 cannot be performed at a high speed, the processor I is entered into a wait state in the data transfer with this main memory 2, and the performance of the processing system reduces.

In order to solve the problem resulting from the low-speediness of the main memory 2 in this processing system shown in FIG. 1, it is conceivable to form the processor 1 and the main memory 2 on the same chip for widening the bus width of the external data bus 3 to perform the data transfer at a high speed.

FIG. 2 is a diagram schematically showing an exemplary structure of such a microcomputer that a processor and a main memory are formed on the same chip. Referring to FIG. 2, the microcomputer 10 includes a cache memory 1a, a controller 1b, a register group 1c and an arithmetic unit 1d, similarly to the structure shown in FIG. 1. This microcomputer 10 further has a built-in main memory 2. The cache memory 1a, the controller 1b, the register group 1c, the arithmetic unit 1d and the main memory 2 are interconnected with each other through an internal data bus 11. This internal data bus 11 is connected to an external data bus through an interface unit 12 to perform transfer of information with an external unit.

By providing the main memory 2 in the microcomputer 10, information with the bus width (bit width) of this internal data bus 11 can be transferred without being subjected to restriction of the number of data input/output terminals of the main memory 2, dissimilarly to the structure shown in FIG. 1. Therefore, a large quantity of information can be simultaneously transferred and high-speed data transfer can be implemented by widening the bus width of this internal data bus 11. Further, the load capacitance of the internal data bus 11 is sufficiently small as compared with the load capacitance of the external data bus 3 which is an on-board wire shown in FIG. 1, and information transfer can be performed between the main memory 2, the cache memory 1a and the controller 1b at a higher speed. At this time, an output circuit of the main memory 2 is not required to drive a large load capacitance since the load capacitance of the internal data bus 11 is small, and current consumption of the processing system is reduced.

When performing transfer of information with the external unit in the structure of this microcomputer shown in FIG. 2, however, the interface unit 12 occupies the internal data bus 11. Thus, there arises such a problem that the controller 1b cannot utilize this internal data bus 11 during access to the main memory 2 by the interface unit 12, for example, arithmetic or logic operations stop during this period and the processing performance of the microcomputer reduces.

In such a microcomputer having a built-in memory, further, there is a sufficient room for further consideration as to what internal bus arrangement makes it possible to efficiently perform information transfer in the interior at a high speed.

There is also sufficient room for further consideration as to how to arrange the processor, the main memory and the interface unit to implement efficient information transfer in the interior of the microcomputer at a high speed and improving the processing performance.

SUMMARY OF THE INVENTION

An object of the present invention is to provide a microcomputer having a built-in memory which can perform information transfer efficiently at a high speed without reducing processing performance.

Another object of the present invention is to provide a microcomputer having a built-in memory whose processing performance does not reduce also in information transfer with the exterior of the microcomputer.

The microcomputer having a built-in memory according to the present invention includes a plurality of data input/output pads, bus interface circuitry which is connected to those plurality of data input/output pads through a first bus to provide an interface for information input/output through these data input/output pads, a first memory which is connected to the bus interface circuitry through a second bus for performing transfer of information with the bus interface circuitry, first bidirectional transfer circuitry which is connected to the first memory through a third bus for bidirectionally transferring information with a selected memory cell of this first memory, and second bi-directional transfer circuitry which is connected to this first bidirectional transfer circuitry through a fourth bus for bidirectionally transferring information at least with this first bidirectional transfer circuitry. The first and second bidirectional transfer circuitries include means latching supplied information and then transferring the latched information.

The microcomputer having a built-in memory according to the present invention further includes a second memory which is connected to the second bidirectional transfer circuitry on/through a fifth bus, a second memory for performing transfer of information with this second bidirectional transfer circuitry, and a processing circuitry which is connected to the second bidirectional transfer circuitry through a sixth bus for performing transfer of information with the second bidirectional transfer circuitry, executing an instruction included in this information, and transmitting data of a result of the execution to the sixth bus.

The bus interface circuitry for performing transfer of information with the exterior of the microcomputer is connected with the first memory through the second bus, and the first and second memories are connected through the first and second bidirectional transfer circuitries having latching and transferring functions. The second memory is connected with the second bidirectional transfer circuitry through the fifth bus, and this second bidirectional transfer circuitry is connected with the processing circuitry through the sixth bus. In information transfer between the bus interface circuitry and the first memory or between the bus interface and the exterior of the microcomputer, therefore, the processing circuitry can perform a processing by accessing the second memory, and reduction of the processing performance in information transfer is prevented. By providing the first and second bidirectional transfer circuitries, further, the processing circuitry can still access the second memory through the second bidirectional transfer circuitry in information transfer from the first memory to the first bidirectional transfer means. Therefore, information transfer can be internally performed without reducing the processing performance.

The foregoing and other objects, features aspects and advantages of the present invention will become more apparent from the following detailed description of the present invention when taken in conjunction with the accompanying drawings.

DESCRIPTION OF THE PREFERRED EMBODIMENTS

Figure 3:
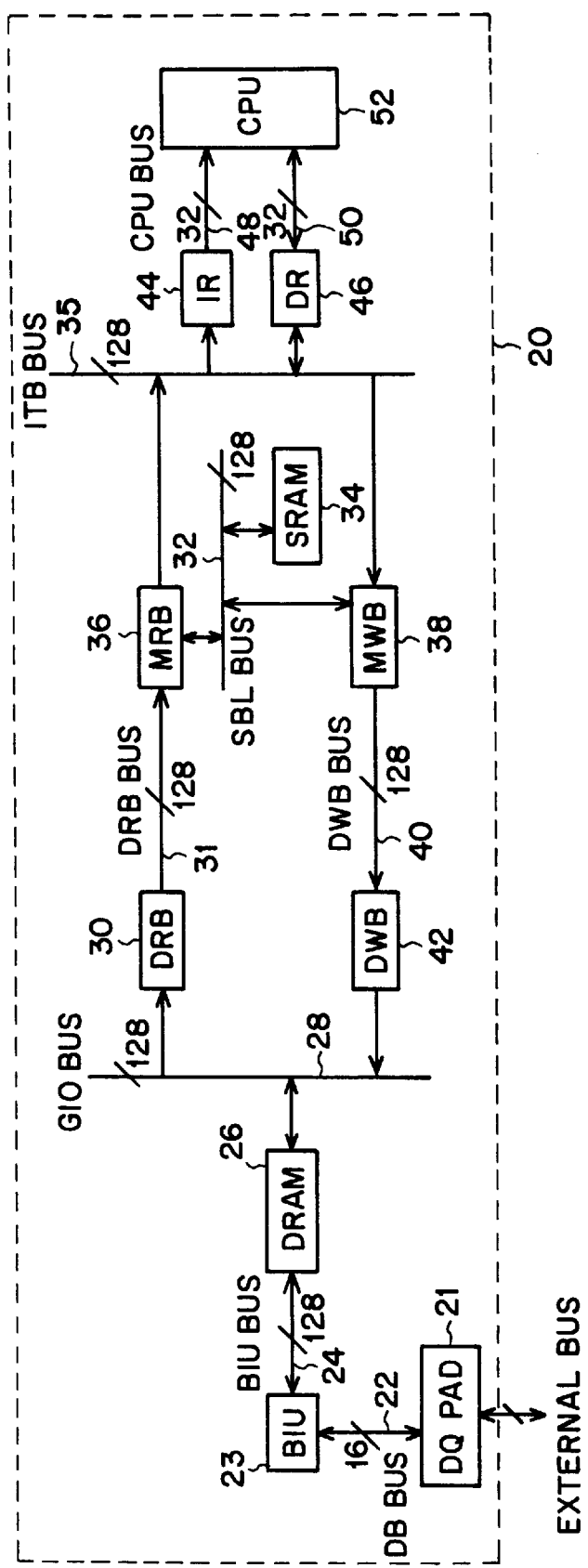
FIG. 3 is a diagram schematically showing the structure of the interior of a microcomputer according to an embodiment 1 of the present invention.

FIG. 3 is a block diagram schematically showing the structure of a main part of a microcomputer having a built-in memory according to an embodiment 1 of the present invention. Referring to FIG. 3, the microcomputer 20 includes a DQ pad 21 connected to an external bus and inputting/outputting information, a bus interface unit (BIU) 23 connected to the DQ pad 21 through a DB bus 22 recited as a first bus and managing and executing information transfer between an exterior and an interior of the microcomputer, and a dynamic random access memory (hereinafter referred to as a DRAM) 26 recited as a first memory connected to the bus interface unit BIU through a BIU bus 24 and transferring stored information with the bus interface unit 23. DRAM 26 is connected to a GIO bus 28 recited as a third bus.

The bus width (bit width) of the DB bus 22 is 16 bits, while the bus width (bit width) of each of the BIU bus 24 and the GIO bus 28 is 128 bits, for example. The bus interface unit 23, the structure of which is described later in detail, includes 128 latches, and executes information transfer in units of 16 bits with an external device and information transfer in units of 128 bits in an internal unit device by selectively connecting these latches to the DB bus 22. Thus, speeding-up of the information transfer in the internal device is attained. The DRAM 26 is a dual port memory having a port connected to the BIU bus 24 and a port connected to the GIO bus 28, and this DRAM 26 can perform information transfer simultaneously with the BIU bus 24 and the GIO bus 28 unless competition of the memory takes place.

The microcomputer 20 further includes a DRAM read buffer (DRB) 30 for latching information read from the DRAM 26 through the GIO bus 28 for transference to a DRB bus 31, and a memory read buffer (MRB) 36 for latching the information supplied from the DRAM read buffer (DRB) 30 through the DRB bus 31 or information read from a static random access memory (hereinafter referred to as an SRAM) 34 through an SBL bus 32 and transferring the latched information to a memory write buffer (MWB) 38 through an ITB bus 35 or the SBL bus 32. This memory read buffer (MRB) 36 includes a circuit for amplifying the latched information. The bit width of each of the GIO bus 28, the DRB bus 31 and the ITB bus 35 is 128 bits, for example. The bus width of the SBL bus 32 is also 128 bits, and the SRAM 34 inputs/outputs information of 128 bits at once.

The memory write buffer (MWB) 38 latches the information supplied on the ITB bus 35 and the information supplied from the memory read buffer (MRB) 36 through the SBL bus 32 for transference to a DRAM write buffer (DWB) 42 through a DWB bus 40. This memory write buffer (MWB) 38 also has a function of transferring the information supplied through the ITB bus 35 to the SRAM 34 through the SBL bus 32.

The DRAM write buffer (DWB) 42 transfers the information supplied from the memory write buffer (MWB) 38 through the DWB bus 40 to the DRAM 26 through the GIO bus 28. The DWB bus 40 has a bus width of 128 bits. By providing the DRB bus 31 and the DWB bus 40 independently of each other, data transfer from the DRAM 26 to the SRAM 34 and data transfer from the SRAM 34 to the DRAM 26 can be executed in parallel.

The microcomputer 20 further includes an instruction register (IR) 44 storing instructions which are included in the information supplied from the memory read buffer (MRB) 36 through the ITB bus 35, and a data register (DR) 46 which is connected with the ITB bus 35 to bidirectionally perform data transfer for storing data. The instruction register 44 and the data register 46 are connected to a processor (CPU) 52 through an instruction bus 48 and a data bus 50 respectively.

The instruction register (IR) contains latches of the same number as the bus width (bit width) of the ITB bus 35, and simultaneously selects 32 latches among these 128 latches and supplies latch information (instruction) to the processor (CPU) 52 through the instruction bus 48. The data register (DR) also similarly includes 128 latches, and selectively connects 32 latches to the data bus 50 to transfer data with the processor (CPU).

Figure 1:
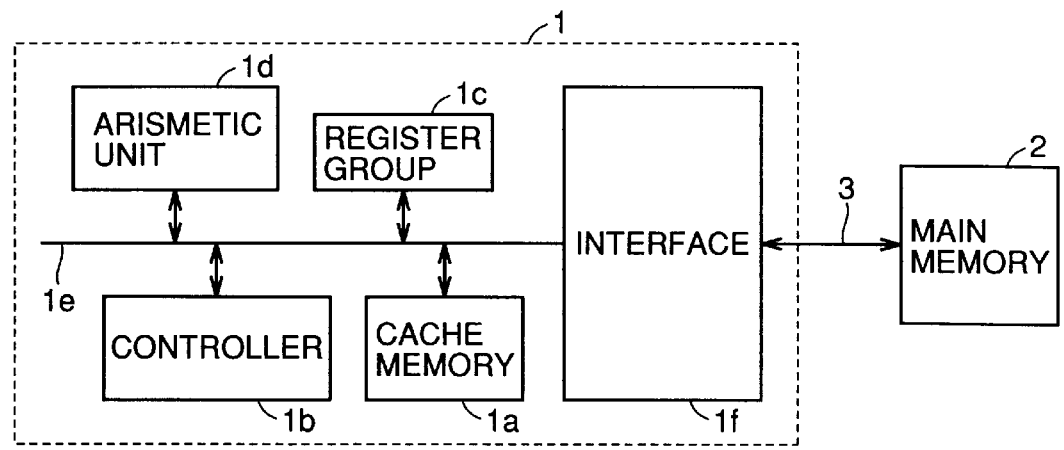
FIG. 1 is a diagram schematically showing the structure of a conventional processor and the structure of a memory system.
Figure 2:
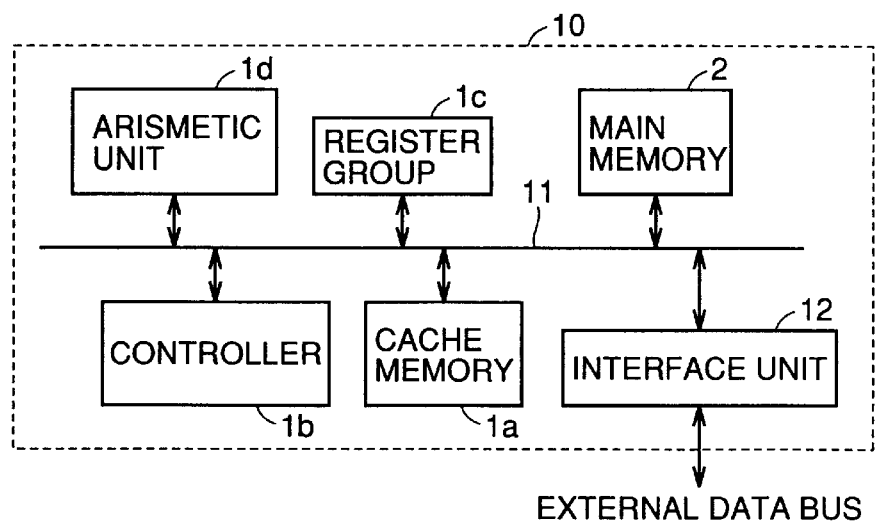
FIG. 2 is a diagram schematically showing a structure in case of making the processing system shown in FIG. 1 on one chip.

The processor (CPU) 52 has an internal structure shown in FIG. 1, executes processing operations specified by instructions on data with the instructions supplied from the instruction register (IR) 44 and the data supplied from the data register (DR) 46, and stores results of the processing operations in the data register (DR) 46 again.

GIO bus 28 transfers the information at a rate of 30 MHz, for example. On the other hand, ITB bus 35 transfers the information at a rate of about 100 MHz, for example.

Figure 4:
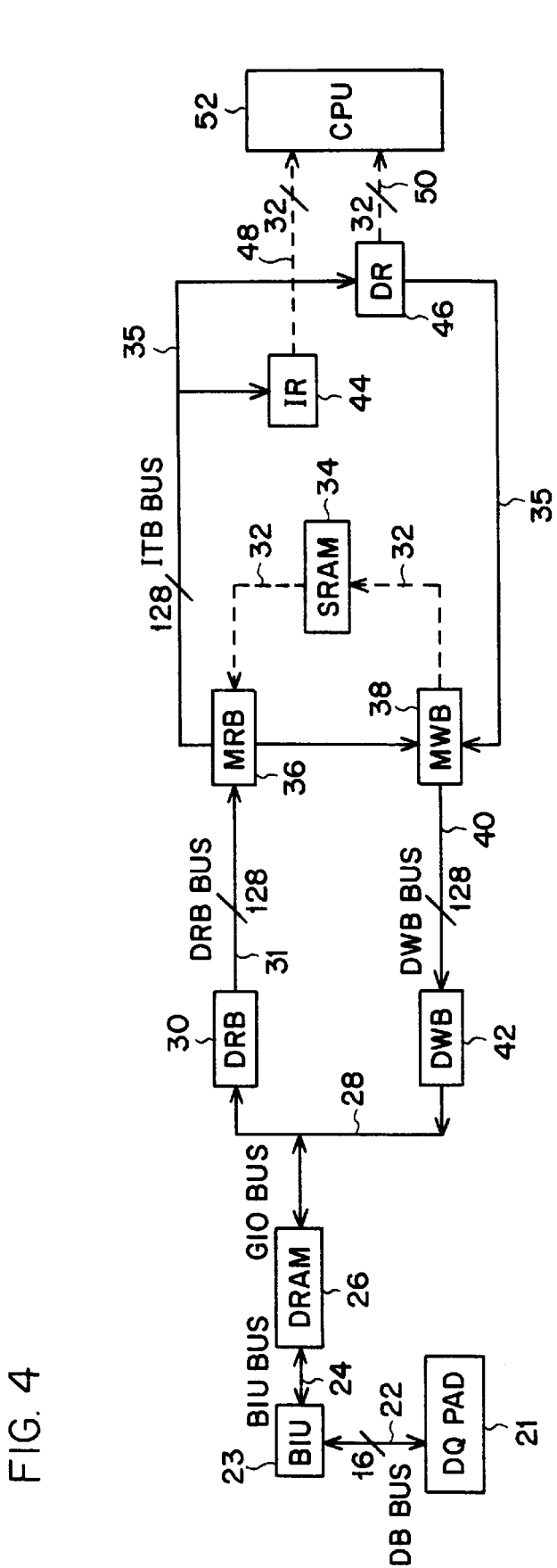
FIG. 4 is a diagram showing the flow of information signals in bus arrangement shown in FIG. 3.

FIG. 4 is a diagram illustratively showing an information transfer path in the bus arrangement of FIG. 3. Referring to FIG. 4, arrows show the flow of information. Referring to FIG. 4, the bus interface unit (BIU) 23 bidirectionally transfers the information with the bus interface unit (BIU) 23 through the BIU bus 24. The DRAM 26 transfers the information of a selected memory cell to the DRAM read buffer (DRB) 30 through the GIO bus 28, and DRAM 26 writes the information supplied from the DRAM write buffer (DWB) through the GIO bus 28 in a selected memory cell. DRAM read buffer 30 transfers latched information to the memory read buffer (MRB) through DRB bus 31. On the other hand, DRAM write buffer (DWB) 42 latches the information supplied from the memory write buffer (MWB) 38 through the DWB bus 40, and then transfers the latching information to DRAM 26 through GIO bus 28.

The memory read buffer (MRB) 36 latches and amplifies one of the information supplied through the DRB bus 31 and the information read from the SRAM 34, for transference to the ITB bus 35 or to the memory write buffer (MWB) 38. By performing information transfer from this memory read buffer (MRB) 36 to the memory write buffer (MWB) 38, information transfer from SRAM 34 to DRAM 26 is enabled.

The memory write buffer (MWB) 38 transfers one of the data supplied from the data register (DR) 46 through the ITB bus 35 and the information supplied from the memory read buffer (MRB) 36 to SRAM 34 or DRAM write buffer (DWB) 42.

The instruction register (IR) 44 stores the instructions included in the information supplied to the ITB bus 35, and supplies the instructions to the processor (CPU) 52 through the instruction bus 48. The data register (DR) 46 stores the data included in the information supplied through the ITB bus 35 and supplies the same to the processor (CPU) 52, while storing the data supplied from this processor (CPU) 52 through the data bus 50 and transferring the same to the memory write buffer (MWB) 38 through the ITB bus 35.

A data transfer operation is now described.

(i) When the processor (CPU) 52 issues an information load request to an external device such as an external memory:

Information supplied from the external memory or the like through the DQ pad 21 and the DB bus 22 is stored in the bus interface unit (BIU) 23. The bus interface unit (BIU) 23 transfers externally loaded information through the BIU bus 24 for writing into the DRAM 26. The DRAM 26 transfers this loaded information to the DRAM read buffer (DRB) 30 through the GIO bus 28. The DRAM read buffer (DRB) 30 latches this information supplied from the DRAM 26 through the GIO bus 28, and then transfers the same to the memory read buffer (MRB) 36 through the DRB bus 31.

The memory read buffer (MRB) 36 amplifies this information transferred from the DRAM read buffer (DRB) 30 for transference to the instruction register (IR) 44 and the data register (DR) 46 through the ITB bus 35. This information transferred to the instruction register (IR) 44 and the data register (DR) 46 is transferred to the processor (CPU) 52 through the instruction bus 48 and the data bus 50 respectively.

The ITB bus 35 transfers the information in accordance with a high-speed clock signal of about 100 MHz, for example, while the information is transferred on the GIO bus 28 in accordance with a low-speed clock signal of about 30 MHz, for example, since the information from the DRAM 26 which is a low-speed memory or the bus interface unit (BIU) 23 accessing the external device is transferred to the GIO bus 28.

After the processor (CPU) 52 issues the information load request and before the required information reaches the processor (CPU) 52, therefore, a considerable cycle number of the clock signal driving this ITB bus 35 is required. In this case, the GIO bus 28 and the ITB bus 35 are isolated from each other, and hence the processor (CPU) 52 can utilize the instruction bus 48 and the data bus 50 as well as the ITB bus 35 until the required information reaches the ITB bus 35.

Figure 5:
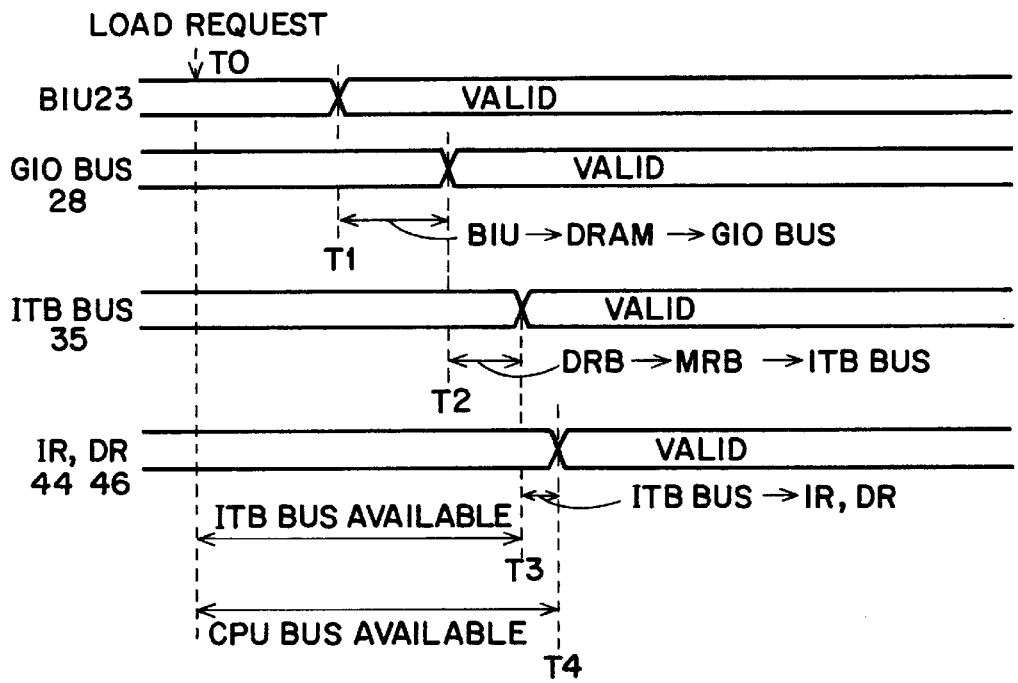
FIG. 5 is a timing chart showing the flow of the information signals in information load request in the embodiment 1 of the present invention.

More specifically, when the processor (CPU) 52 generates a load request at a time T0 as shown in an information transfer sequence of FIG. 5, valid information is stored in the bus interface unit (BIU) 23 at a time T1. The information stored in the bus interface unit (BIU) 23 is transferred to the GIO bus 28 through the DRAM 26, and the valid information appears on the GIO bus 28 at a time T2. This valid information on the GIO bus 28 is transferred to the ITB bus 35 through the DRAM read buffer (DRB) and the memory read buffer (MRB), and the valid information is transferred onto the ITB bus 35 at a time T3. This valid information on the ITB bus 35 is transferred to the instruction register (IR) 44 and the data register (DR) 46 respectively, and the valid information requested by the processor (CPU) is stored in the instruction register (IR) 44 and the data register (DR) 46 at a time T4. After the time T4, the processor (CPU) can access the required load-requested information in the instruction register (IR) 44 and the data register (DR) 46.

When a load request to the external memory or the like is issued as shown in this FIG. 5, therefore, the processor (CPU) can access the SRAM 34 through this ITB bus 35 and can access the instruction register (IR) 44 and the data register (DR) 46 through a CPU bus (including both of the instruction bus 48 and the data bus 50) up to the time T3 when the valid information is transferred onto the ITB bus 35. Up to the time T4 when the valid information is stored in the instruction register (IR) 44 and the data register (DR) 46, further, the processor (CPU) can access the instruction register (IR) 44 and the data register (DR) 46 through the CPU bus (the instruction bus 48 and the data bus 50) to perform a processing.

By providing the GIO bus 28, the ITB bus 35 and the CPU bus (the instruction bus 48 and the data bus 50) independently of each other, therefore, the processor (CPU) can execute a processing through an available bus until the load-requested information arrives, and reduction in processing performance upon data transfer from the external device is suppressed.

Figure 6:
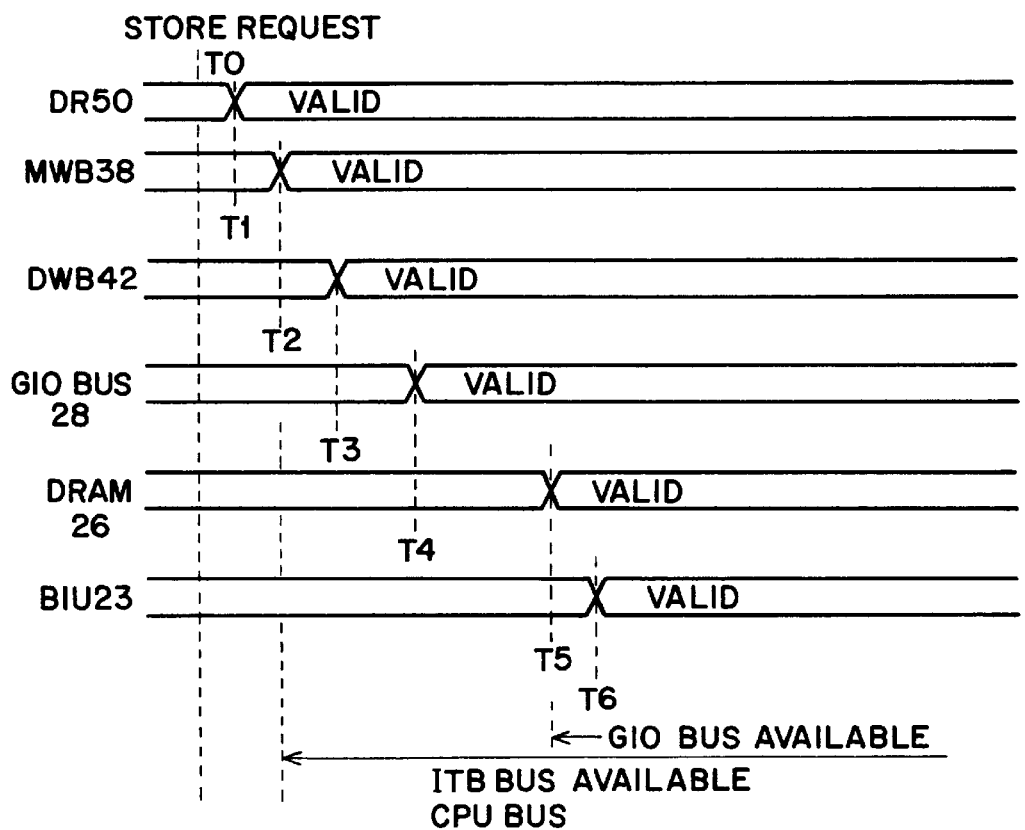
FIG. 6 is a timing chart showing the flow of information signals in generation of information store request.

(ii) When the processor issues a data store request for storing data in the external memory or the like:

An operation in data store request issuance is described also with reference to a timing chart shown in FIG. 6.

At a time T0, the processor (CPU) 52 generates a store request while storing data to be stored in the data register (DR) 50 through the data bus 50, and valid data is stored in the data register (DR) 50 at a time T1. The data stored in the data register (DR) 50 is transferred to the memory write buffer (MWB) 38 through the ITB bus 35 and stored therein. The data stored in the memory write buffer (MWB) 38 is transferred to the DRAM write buffer (DWB) 42 through the DWB bus 40 and latched therein. The memory write buffer (MWB) 38 has a latch function. After the data to be stored is stored in memory write buffer (MWB) 38, therefore, the processor (CPU) 52 can access the SRAM 34 and the instruction register (IR) 44 and the data register (DR) 46 through the ITB bus 35 and the CPU bus (the instruction bus 38 and the data bus 50) for executing a processing. This ITB bus 35 is a high-speed bus, and the processor (CPU) 52 can execute a required processing at a high speed after transferring the data to be stored to and storing them in the memory write buffer (MWB) 38 through the data register (DR) 50, and performance reduction of this microcomputer is suppressed.

The data (brought into a valid state at a time T3) latched in the DRAM write buffer (DWB) 42 is transferred to and stored in the DRAM 26 through the low-speed GIO bus 28. The GIO bus 28 is a low-speed bus and the valid data appears thereon at a time T4, and the valid data is stored in the DRAM 26 at a time T5. The DRAM 26 is a two-port memory, and the valid data can be stored from the DRAM 26 in the bus interface unit (BIU) 23 at a relatively fast timing by performing the writing and reading in the same cycle. Thus, the valid data in the bus interface unit 23 which is brought into the valid state is successively transferred to the exterior in units of 16 bits and stored in the external memory at a time T6. Also when the data store operation for the external memory is done in this microcomputer, therefore, the internal processor (CPU) 52 can access the SRAM 34 through the ITB bus 35 after the time T2, while the GIO bus 28 becomes available after the time T5 and reduction of the processing performance can be suppressed.

When only data transfer between the external memory and the DRAM 26 is performed, the processor (CPU) 52 can execute required processings by constantly utilizing the ITB bus 35, the instruction bus 48 and the data bus 50, as apparent from the timing chart diagrams shown in FIG. 5 and FIG. 6.

By connecting the bus interface unit (BIU) for performing data input/output with the external device only to the DRAM, isolating any buses (the ITB bus 35, the instruction bus 48 and the data bus 50) accessed by the processor (CPU) from the bus interface unit (BIU), providing the buffers (DRB, DWB, MRB and MWB) recited as bidirectional transfer means between the GIO bus 28 connected with the DRAM 26 and the ITB bus 35, and providing these with latch functions, as hereinabove described, the internal ITB bus can be brought into a free state so that the processor (CPU) can utilize the same also in information transfer of this microcomputer with an external device, and the processing performance can be improved due to no interruption of processing in external transfer of the information.

The DB bus 22 between the bus interface unit (BIU) and the DQ pad may be of such a structure that a bus for inputting formation and a bus for outputting information are provided independently of each other.

[Structures of Respective Parts]

(1) Structure of Data Register (DR) 46

Figure 7:
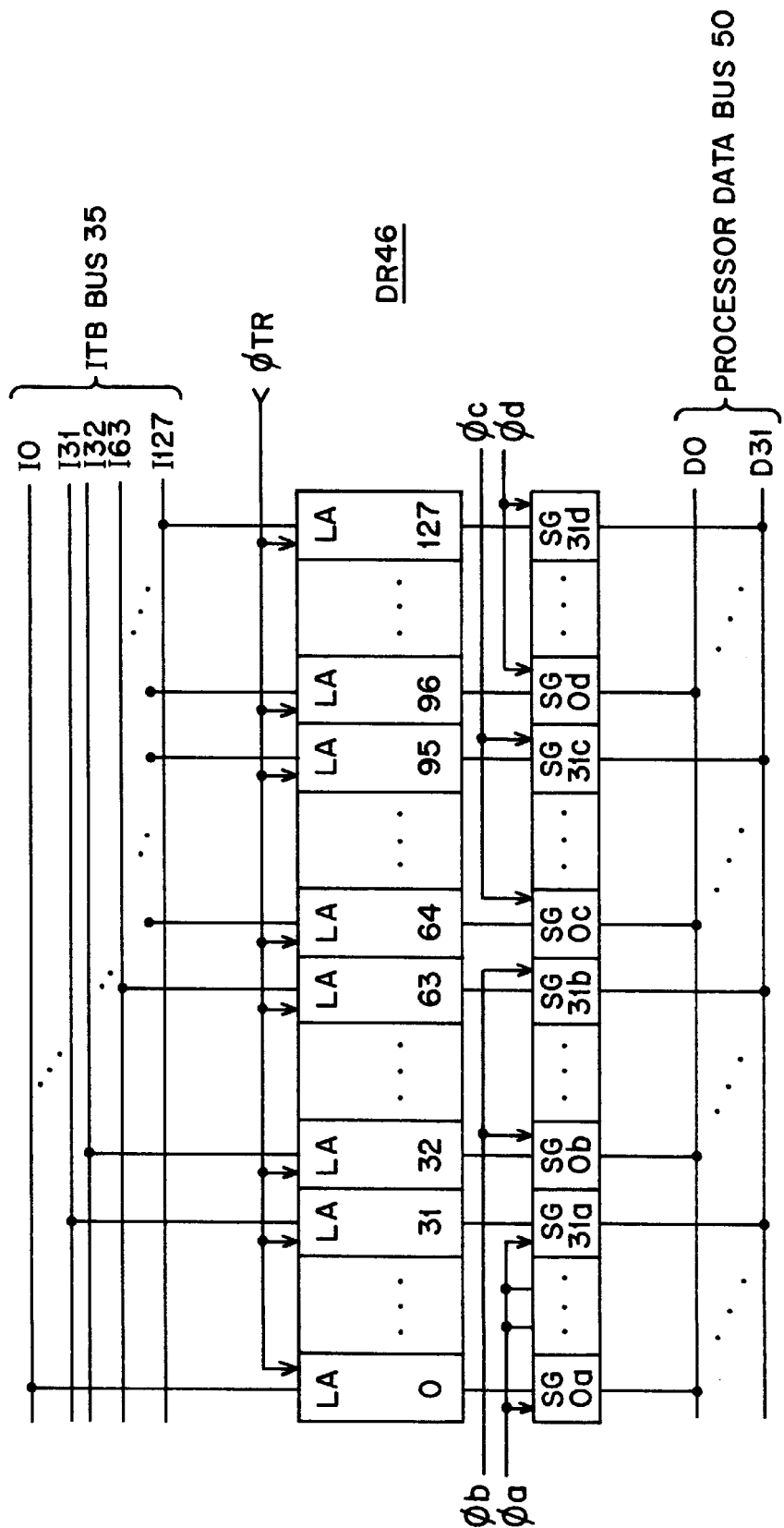
FIG. 7 is a diagram schematically showing the overall structure of a data register (DR) shown in FIG. 3.

FIG. 7 is a diagram schematically showing the overall structure of the data register (DR) 46 shown in FIG. 3 and FIG. 4. Referring to FIG. 7, the data register (DR) 46 includes latch amplifiers LA0 to LA127 which are provided in correspondence to bus lines I0 to I127 of the ITB bus 35 respectively and connected with the corresponding bus lines in response to activation of a transfer instruction signal φTR. These latch amplifiers LA0 to LA127, the structure of which is described later in detail, include both of read buffers for transferring data from the ITB bus 35 to the processor (CPU) and write buffers for transferring data supplied from the processor (CPU) to the ITB bus 35. Each of these amplifies and latches supplied data when activated.

The data register (DR) 46 further includes selecting gates SG0a to SG31a which are provided in correspondence to the latch amplifiers LA0 to LA31 respectively and conduct in response to a group selection signal φa for connecting the latch amplifiers LA0 to LA31 to bus lines D0 to D31 of the processor data bus 50, selection gates SG0b to SG31b which are provided in correspondence to the latch amplifiers LA32 to LA63 respectively and conduct in response to a group selection signal φb for connecting the latch amplifiers LA32 to LA63 to the data bus lines D0 to D31 respectively, selection gates SG0c to SG31c which are provided in correspondence to the latch amplifiers LA64 to LA95 respectively and conduct in response to a group selector signal φc for connecting the respective latch amplifiers LA64 to LA95 to the data bus lines D0 to D31, and selection gates SG0d to SG31d which are provided in correspondence to the latch amplifiers LA96 to LA127 respectively and conduct in response to a group selection signal φd for connecting the latch amplifiers LA96 to LA127 to the data bus lines D0 to D31 respectively.

Transfer of information of different bit widths can be performed by making the bus widths of the ITB bus 35 and the processor data bus 50 different from each other, and there is no requirement to deteriorate the processing performance of the processor (CPU) 52. Further, the bus width of the data bus 50 for the processor (CPU) 52 is small, and the layout area required for the bus in the vicinity of this processor (CPU) 52 can be reduced.

In this structure of the data register (DR) 46 shown in FIG. 7, the bus lines I0 to I127 of the ITB bus 35 and the latch amplifiers LA0 to LA127 simultaneously transfer data of 128 bits in accordance with the transfer instruction signal φTR. Among these latch amplifiers LA0 to LA127 of 128 bits, latch amplifiers of 32 bits are selectively connected to the processor data bus 50 (the data bus lines D0 to D31) in accordance with the group selection signals φa to φd.

Figure 8:
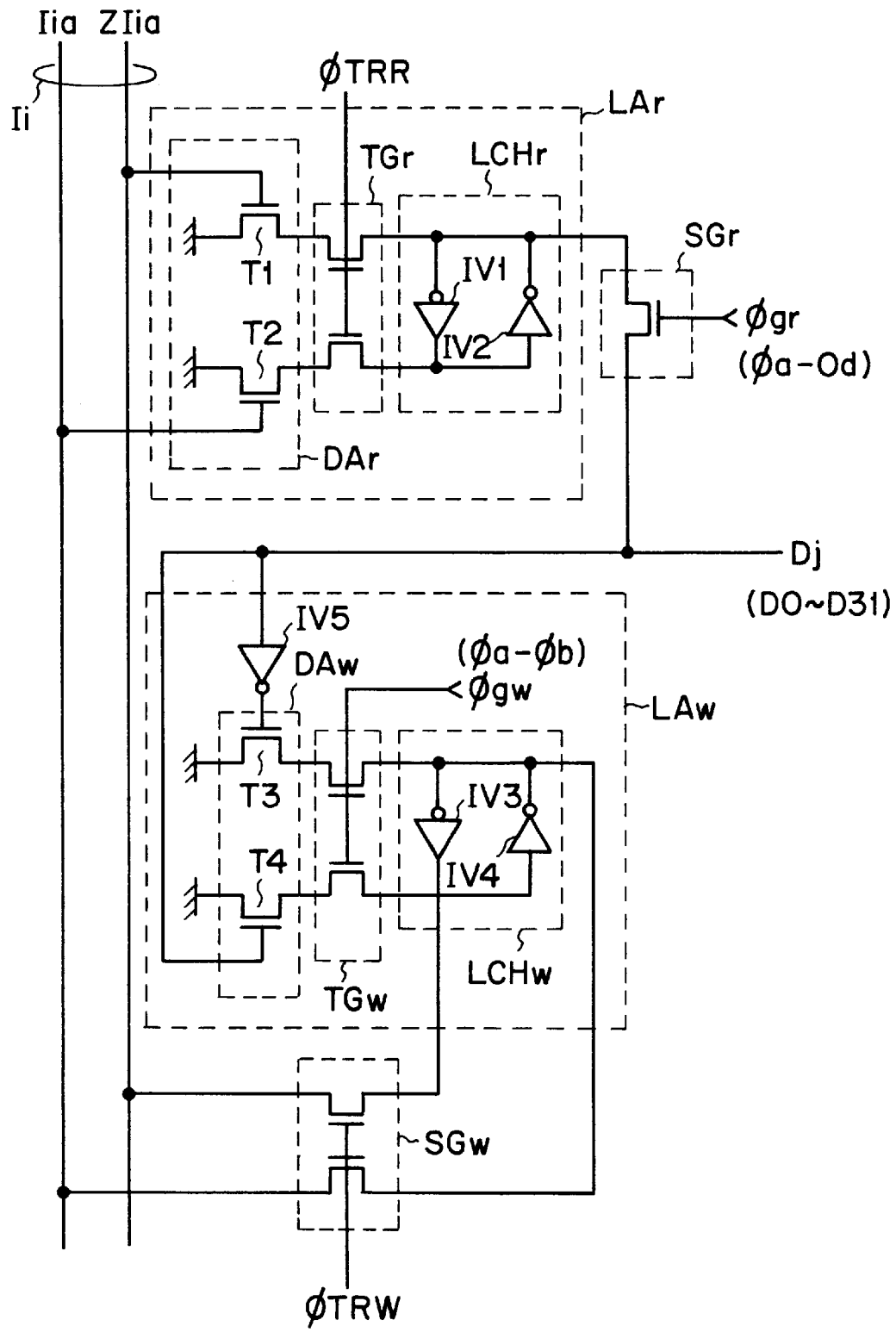
FIG. 8 is a diagram showing the structure of a 1-bit part of an instruction register shown in FIG. 3.

FIG. 8 is a diagram showing exemplary a structure of one bit of each of the latch amplifiers and the selection gates shown in FIG. 7. Referring to FIG. 8, the structures of a latch amplifier and a selection gate provided for a bus line Ii and a data bus line Dj of the ITB bus 35 are shown as an example. The ITB bus line Li includes complementary signal lines Iia and ZIia.

The latch amplifier includes a read latch amplifier LAr which is activated in response to a transfer instruction signal φTRR for amplifying and latching complementary signals on the ITB bus line Ii, and a write latch amplifier LAw for amplifying and latching a signal on the data bus line Dj. The selection gate SG includes a read selection gate SGr which conducts in response to a group selection signal φgr for transferring the latch data of the read latch amplifier LAr to the data bus line Dj, and a write selection gate SGw transferring the latch information of the write latch amplifier LAw to the ITB bus signal lines Iia and ZIia in response to a transfer instruction signal φTRW.

The transfer instruction signals φTRR and φTRW are supplied in common to the latch amplifiers LA0 to LA126 in both read transfer and write transfer. The group selection signals φgr and φgw are supplied only to a latch amplifier group of a selected group in both read transfer and write transfer.

The read latch amplifier LAr includes a differential amplifier DAr differentially amplifying signal potentials on the signal lines Iia and ZIia, a transfer gate TGr conducting in response to the read transfer instruction signal φTRR, and a latch circuit LCHr amplifying and latching data from the differential amplifier circuit DAr transmitted through the transfer gate TGr. The differential amplifier circuit DAr includes an n-channel MOS transistor (insulated gate field effect transistor) T1 connected between the transfer gate TGr and a ground potential with a gate thereof connected to the signal line ZIia, and an n-channel MOS transistor T2 connected between a ground node and the transfer gate TGr with a gate thereof connected to the signal line Iia. The latch circuit LCHr includes an invertor circuit IV1 having an input part connected to a drain node of the MOS transistor T1 through the transfer gate TGr, and an invertor circuit IV2 having an input part connected to a drain node of the MOS transistor T2 through the transfer gate TGr. The transfer gate TGr includes n-channel MOS transistors which are provided in correspondence to the MOS transistors T1 and T2 respectively. The read selection gate SGr includes a transfer gate which conducts in response to the group selection signal φgr for transmitting an output signal of the invertor IV2 to the data line Dj. While one n-channel MOS transistor is typically shown as the transfer gate included in this read selector gate SGr, the transfer gate may be formed by a CMOS transmission gate. Further, this read selection gate SGr may be formed by a tri-state buffer.

The write latch amplifier LAw includes an invertor circuit IV5 inverting a signal on the data line Dj, a differential amplifier circuit DAw differentially amplifying an output signal of the invertor circuit IV5 and the signal of the data line Dj, a transfer gate TGw transmitting an output signal of this differential amplifier circuit DAw in response to the group selection signal φgw, and a latch circuit LCHw latching the output signal of the differential amplifier circuit DAw transmitted through the transfer gate TGw.

The differential amplifier circuit DAw includes an n-channel MOS transistor T3 connected between the transfer gate TGw and a ground node and receiving the output signal of the invertor circuit T5 at a gate thereof, and an n-channel MOS transistor T4 connected between a ground node and the transfer gate TGw with a gate thereof connected to the data line Dj. The transfer gate TGw includes transfer gate transistors provided in correspondence to the MOS transistors T3 and T4 respectively.

The latch circuit LCHw includes an invertor circuit IV3 having an input part connected to a drain node of the MOS transistor T3 through the transfer gate TGw, and an invertor circuit IV4 having an input part connected to a drain node of the MOS transistor T4 through the transfer gate TGw.

The write selection gate SGw includes a transfer gate transistor pair conducting in response to the write transfer instruction signal φTRW for transferring output signals of the invertor circuits IV3 and IV4 to the signal lines ZIia and Iia respectively. The operation is now briefly described.

It is assumed now that the signal on the signal line Iia is at a high level and the signal on the signal line ZIia is at a low level. In this state, the conductance of the MOS transistor T1 becomes smaller than the conductance of the MOS transistor T2 in the differential amplifier circuit DAr. When the read transfer instruction signal φTRR enters an active state (high level), the transfer gate TGr is brought into a conducting state, and the MOS transistors T1 and T2 of the differential amplifier circuit DAr are connected to the invertor circuits IV1 and IV2 respectively. The potential of an input node of the invertor circuit IV2 reduces since the conductance of the MOS transistor T2 is larger than the conductance of the MOS transistor T1. This potential reduction of the input node of the invertor circuit IV2 is amplified and latched by the invertor circuit IV2 and the invertor circuit IV1. Thus, a small potential difference detected by the differential amplifier circuit DAr is amplified and latched by the latch circuit LCHr. When the group selection signal φgr then enters an active state (high level), the read selection gate SGr conducts, and the output signal (high level) of the invertor circuit IV2 is transmitted to the data line Dj, and transmitted to the processor.

In data transfer from the processor to the ITB bus, the write latch amplifier circuit LAw is activated. When data of a high level is transferred onto the data line Dj, the output signal of the invertor circuit IV5 is at a low level. In this state, the conductance of the MOS transistor T3 becomes smaller than that of the MOS transistor T4 in the differential amplifier circuit DAw. When the group selection signal φgw shifts to an active state (high level), the transfer gate TGw is brought into a conducting state, and the differential amplifier circuit DAw is connected to the latch circuit LCHw. Due to the large conductance of the MOS transistor T4, the potential of the input node of the invertor circuit IV4 reduces. This potential reduction is amplified and latched by the invertor circuits IV4 and IV3 (the MOS transistor T3 is substantially in an OFF state). Then, the write transfer instruction signal φTRW shifts to an active state (high level), and the selection gate SGw conducts. Thus, the signal of a low level outputted from the invertor circuit IV3 and the signal of a high level outputted from the invertor circuit IV4 are transmitted to the signal lines ZIia and Iia respectively.

[Structure of Instruction Register (IR)]

The instruction register (IR) is merely required to transfer instructions to the processor (CPU) through the instruction bus. This instruction register (IR) also has a structure substantially identical to the data register (DR) 46 shown in FIG. 7.

Figure 9:
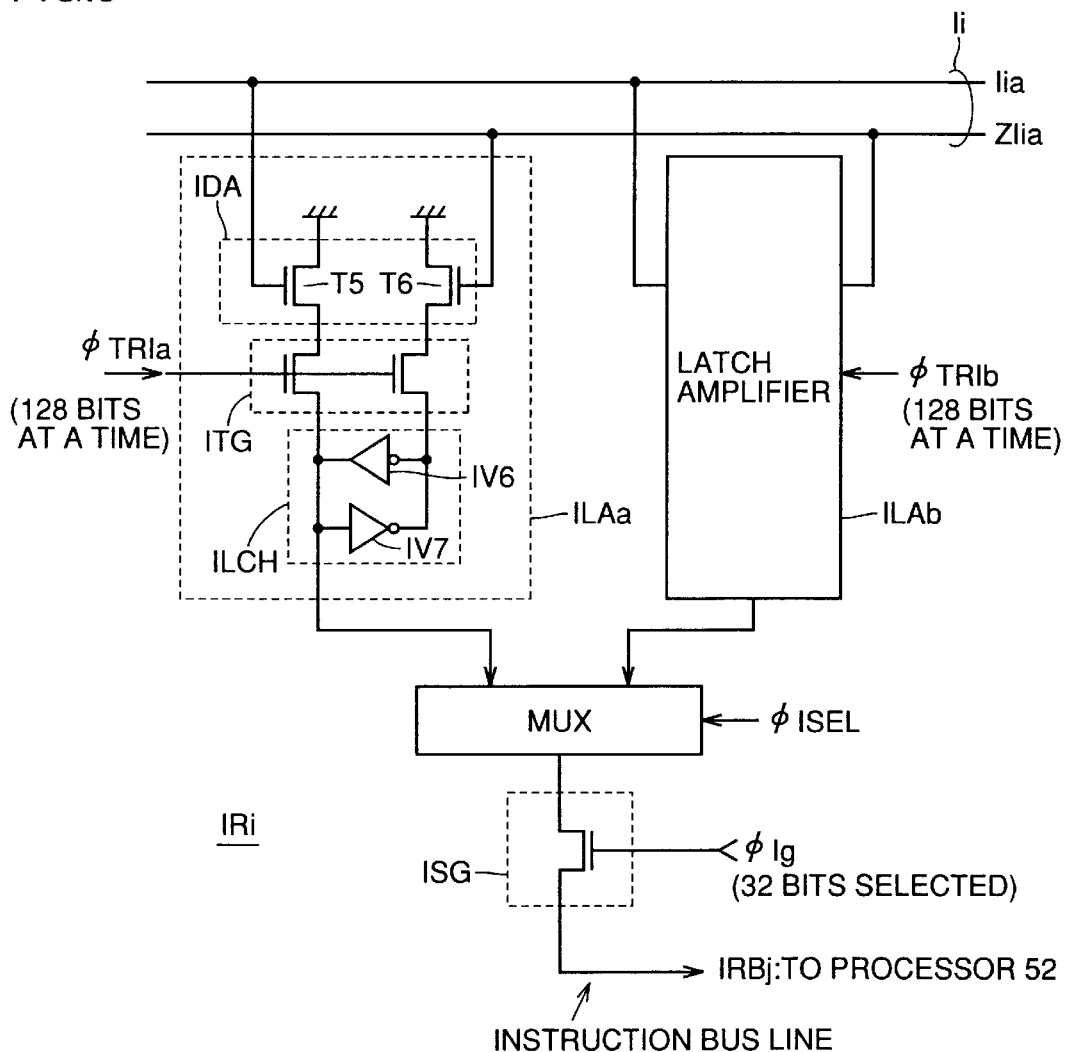
FIG. 9 is a diagram showing the structure of a 1-bit part of the data register shown in FIG. 7.

FIG. 9 is a diagram schematically showing a structure of a 1-bit of the instruction register (IR). An instruction register IRi provided in correspondence to the ITB bus line Ii is shown in FIG. 9. Referring to FIG. 9, the instruction register IRi includes two latch amplifiers ILAa and ILAb connected to the ITB bus line Ii in parallel with each other.

The latch amplifier ILAa is activated in response to a transfer instruction signal φTRIa, for amplifying and latching the complementary signals on the ITB bus line Ii. The latch amplifier ILAb is activated in response to a transfer instruction signal φTRIb, for amplifying and latching the complementary signals on this ITB bus line Ii. FIG. 9 shows only the structure of the latch amplifier ILAa. The latch amplifier ILAb has a structure similar to the latch amplifier ILAa.

The latch amplifier ILAa includes a differential amplifier circuit IDA differentially amplifying the signals on the signal lines Iia and ZIia of the bus line Ii, a transfer gate ITG conducting in response to the transfer instruction signal φTRIa for transmitting an output signal of the differential amplifier circuit IDA, and a latch circuit ILCH amplifying and latching the signal transmitted through the transfer gate ITG.

The differential amplifier IDA includes an n-channel MOS transistor T5 thereof connected between a ground node and the transfer gate ITG with a gate thereof connected to the signal line Iia, and an n-channel transistor T6 connected between a ground node and the transfer node ITG with a gate thereof connected to the signal line ZIia.

The transfer gate ITG includes two MOS transistors (transfer gate transistors) provided in correspondence to the MOS transistors T5 and T6 respectively and conducting in activation of the transfer instruction signal φTRIa. This transfer gate ITB may be formed by a CMOS transmission gate.

The latch circuit ILCH includes an invertor circuit IV6, having an input part connected to a drain of the MOS transistor T6 through the transfer gate ITG, and an invertor circuit IV7 whose input part is connected to a drain of the MOS transistor T5 through the transfer gate ITG.

The instruction register IRi further includes a multiplexer MUX selecting an output signal of one of the latch amplifiers ILAa and ILAb in response to a selection signal φISEL, and a selection gate ISG conducting in response to a group selection signal φIg for transmitting the signal selected in the multiplexer MUX to an instruction bus line IRBj. While the selection gate ISG is shown being formed by one MOS transistor in FIG. 10, this selection gate ISG may be formed by a CMOS transmission gate or a tri-state buffer.

The transfer instruction signal φTRIa is supplied in common to the latch amplifier ILAa provided for each ITB bus line of the instruction register IR. The transfer instruction signal φTRIb is supplied in common to the latch amplifier ILAb in each register of the instruction register (IR). One of the transfer instruction signals φTRIa and φTRIb is brought into an active state. The group selection signal φIg selects instruction registers of 32 bits.

Operations of the latch amplifiers ILAa and ILAb in activation thereof are identical to that of the data register (DR) (see FIG. 8), and the signals of the signal lines Iia and ZIia are differentially amplified by the differential amplifier circuit IDA, and an output signal of the differential amplifier circuit IDA is transferred to the latch circuit ILCH and further amplified and latched therein in conduction of the transfer gate ITG. Therefore, signals of the ITB bus lines I0 to I127 of 128 bits are simultaneously latched by the latch amplifier ILAa or ILAB of 128 bits of the instruction register (IR). Then, one of the latch amplifiers ILAa and ILAb is selected in accordance with the selection signal φISEL. Further, instructions of 32 bits are selected from these instructions of 128 bits in accordance with the group selection signal φIg, transferred to the instruction bus line (IRB) 48 and supplied to the processor 52.

The latch amplifiers ILAa and ILAb are provided in each bit of the instruction register (IR). A next instruction is stored in a first latch amplifier while transmitting instruction information stored in a second latch amplifier. Thus, instructions can be successively transferred to the processor (CPU) 52 in a pipeline mode, and high-speed instruction transfer can be implemented.

By providing the instruction register (IR) and the data register (DR) independently of each other, further, instructions and data can be simultaneously transferred to the processor (CPU) 52, and a high-speed information transfer operation can be implemented.

(3) Bus Interface Unit (BIU)

Figure 10:
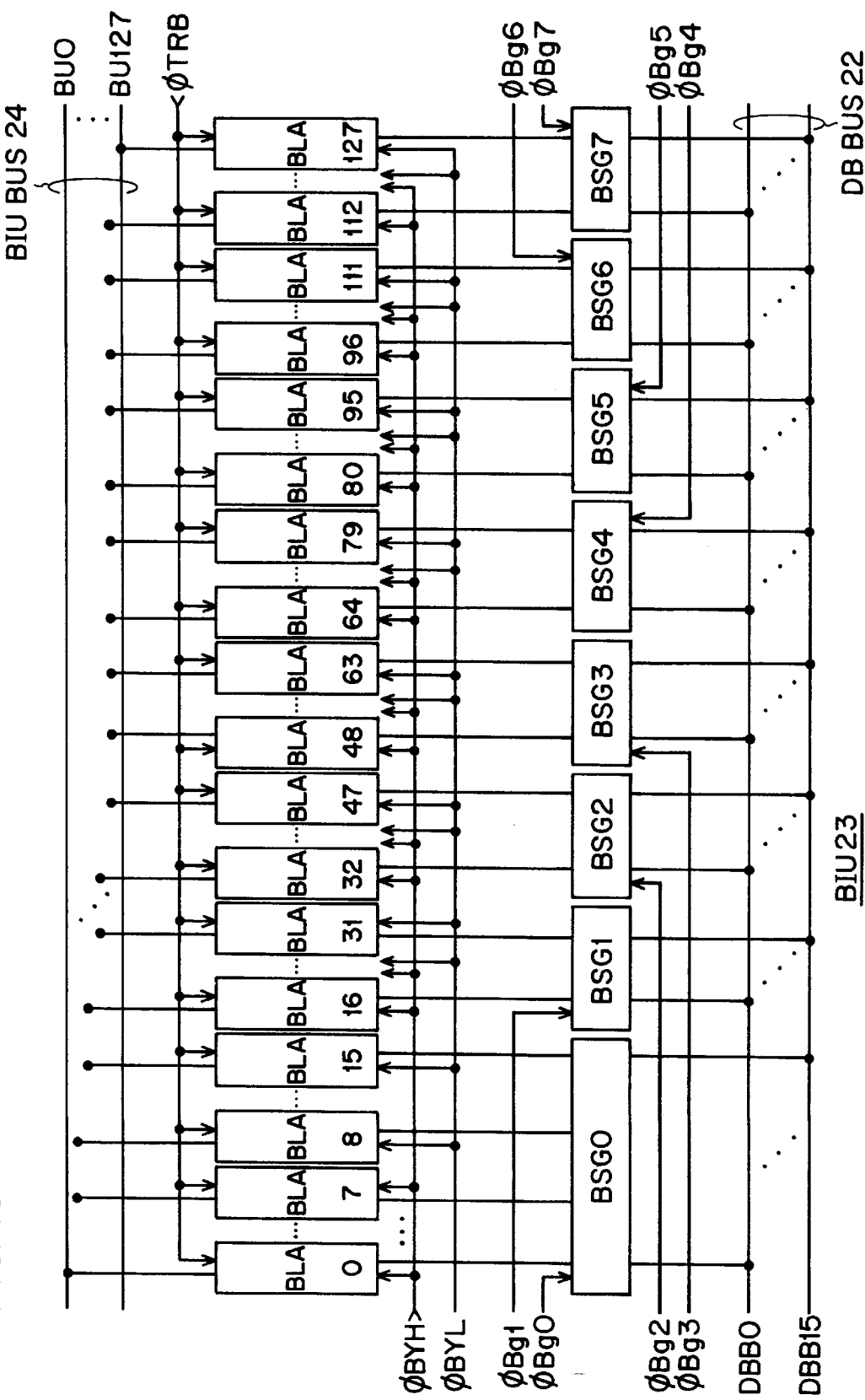
FIG. 10 is a block diagram schematically showing the overall structure of a bus interface unit (BIU) shown in FIG. 3.

FIG. 10 is a diagram schematically showing the overall structure of the bus interface unit (BIU) shown in FIG. 3 and FIG. 4. Referring to FIG. 10, the bus interface unit (BIU) 23 includes latch amplifiers BLA0 to BLA127 provided in correspondence to bus lines BU0 to BU127 of the BIU bus 24 respectively, activated in response to a transfer instruction signal φTRB to be connected with the corresponding bus lines BU0 to BU127.

Each of the latch amplifiers BLA0 to BLA127 includes a latch amplifier circuit for information transfer from the BIU bus 24 to the DB bus 22 and a latch amplifier circuit for information transfer from the DB bus 22 to the BIU bus 24. The latch amplifiers BLA0 to BLA127 are divided into groups in a unit of eight latch amplifiers, and brought into operating states in response to byte control signals φBYH and φBYL. By employing these byte control signals φBYH and φBYL, it is possible to handle both of 16-bit information and 8-bit information.

The bus interface unit (BIU) 23 further includes selection circuits BSG0 to BSG7 for selecting 16 latch amplifiers from the 128 latch amplifiers BLA0 to BLA126 for connection to the bus lines DB0 to DB15 of the DB bus 22 respectively. The selector circuit BSG0 conducts in response to a group selection signal φBg0, for connecting the latch amplifiers BLA0 to BLA15 to bus lines DBB0 to DBB15 of the DB bus 22 respectively. The selection circuit BSG1 conducts in response to a group selection signal φBg1, for connecting the latch amplifiers BLA16 to BLA31 to the bus lines DBB0 to DBB15 respectively. The selection circuit BSG2 conducts in response to a group selection signal φBg2, for connecting the respective latch amplifiers BLA32 to BLA47 to the bus lines DBB0 to DBB15. The selection circuit BSG3 conducts in response to a group selection signal φBg3, for connecting the respective latch amplifiers BLA48 to BLA63 to the bus lines DBB0 to DBB15.

The selection circuit BSG4 conducts in response to a group selection signal φBg3, for connecting the latch amplifiers BLA64 to BLA79 to the bus lines DBB0 to DBB15. The selection circuit BSG5 conducts in response to a group selection signal φBg5, for connecting the latch amplifiers BLA80 to BLA95 to the bus lines DBB0 to DBB15. The selection circuit BSG6 conducts in response to a group selector signal φBg6, for connecting the latch amplifiers BLA96 to BLA111 to the bus lines DBB0 to DBB15. The selection circuit BSG7 conducts in response to a group selection signal φBg7, for connecting the latch amplifiers BLA112 to BLA127 to the bus lines DBB0 to DBB15.

By employing the selection circuits BSG0 to BSG7, transfer of information between the BIU bus 24 of the 128-bit width and the DB bus 22 of the 16-bit width can be efficiently performed. The DQ pads are connected to the respective bus lines DB0 to DB15 of the DB bus 22. Bus lines of 16 bits are merely connected to the external device, it is not necessary to provide 128 input/output buffers for driving external bus lines, the number of these input/output buffers is reduced, and current consumption is also reduced.

Figure 11:
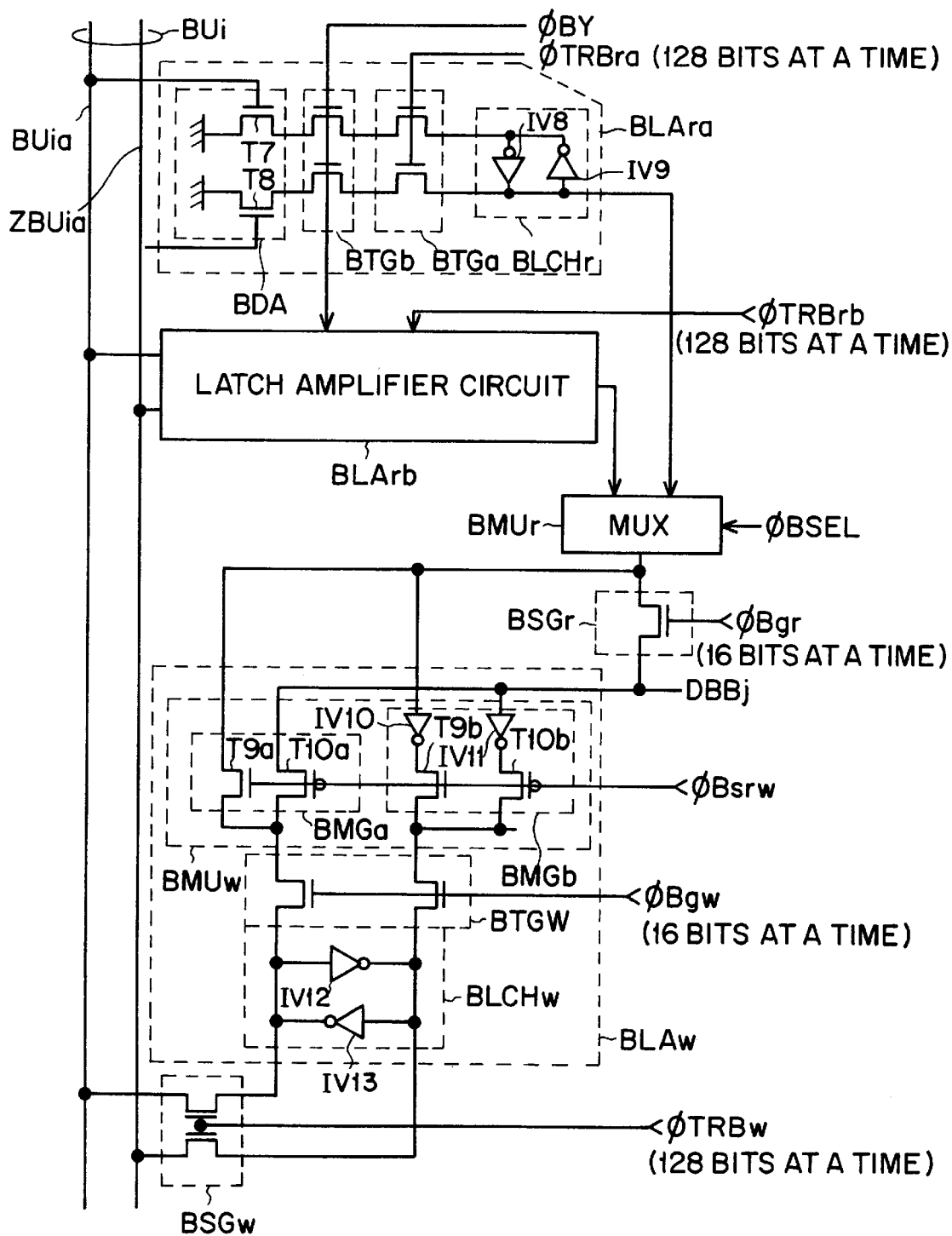
FIG. 11 is a diagram showing the structure of a 1-bit part of the bus interface unit shown in FIG. 10.

FIG. 11 is a diagram showing a structure of a one-bit portion of the bus interface unit shown in FIG. 10. The structure of a bus interface unit circuit provided between a bus line BUi of the BIU bus 24 and a bus line DBBj of the DB bus 22 is shown in this FIG. 11. The bus line BUi includes complementary signal lines BUia and ZBUia.

Referring to FIG. 11, the bus interface unit circuit (1-bit bus interface unit) includes a latch amplifier circuit BLAra which is brought into an operating state in response to a byte control signal φBY and a transfer instruction signal φTRBra for amplifying and latching signal potentials on the signal lines BUia and ZBUia, a latch amplifier circuit BLArb which is brought into an operating state in response to the byte control signal φBY and a transfer instruction signal φTRBrb for amplifying and latching the signals on the signal lines BUia and ZBUia, a multiplexer (MUX) BMUr selecting one of latched signals of the latch amplifier circuits BLAra and BLArb in response to a selection signal φBSEL, and a selection circuit BSGr which conducts in response to a group selection signal φBgr for transmitting an output signal of the multiplexer BMUr to the DBB bus line DBBj.

The byte control signal φBY is one of the byte control signals φBYH and φBYL. One of the 128 bit-batch transfer instruction signals φTRBra and φTRBrb is brought into an active state. In output of the latched signal from one of the latch amplifier circuits BLAra and BLArb, information signals of the signal lines BUia and ZBUia are stored in the other latch amplifier circuit. Thus, high-speed information transfer is implemented.

The latch amplifier circuits BLAra and BLArb have the same structure, and FIG. 11 specifically shows only the circuit structure of the latch amplifier circuit BLAra. The latch amplifier circuit BLAra includes a differential amplifier circuit BDA which differentially amplifies signal potentials on the signal lines BUia and ZBUia, a transfer gate BTGb which conducts in response to the byte control signal φBY for transmitting an output signal of the differential amplifier circuit BDA, a transfer gate BTGa which conducts in response to the transfer instruction signal φTRBra for further transmitting the signal transmitted from the transfer gate BTGb, and a latch circuit BLCHr which amplifies and latches the signal potential transferred from the transfer gate BTGa.

The differential amplifier circuit BDA includes an n-channel MOS transistor T7 provided between a ground node and the transfer gate BTGb with a gate thereof connected to the signal line BUia, and an n-channel MOS transistor T8 provided between a ground node and the transfer gate BTGb with a gate thereof connected to the signal line ZBUia.

The transfer gate BTGb includes a pair of transfer gate transistors provided in correspondence to the respective MOS transistors T7 and T8 and conducting in response to the byte control signal φBY. The transfer gate BTGa includes a transfer gate transistor pair provided for the respective transfer gate transistor pair of the transfer gate BTGb and conducting in response to the transfer instruction signal φTRBra. The transfer gate transistors of the transfer gates BTGa and BTGb may be formed by CMOS transmission gates.

The latch circuit BLCHr includes an invertor circuit IV8 having an input connected to a drain node of the MOS transistor T7 in conduction of the transfer gates BTGa and BTGb, and an invertor circuit IV9 having an input connected to a drain node of the MOS transistor T8 in conduction of the transfer gates BTGa and BTGb.

When the signal potential of the signal line BUia is at a high level, the conductance of the MOS transistor T7 becomes larger than that of the MOS transistor T8, and the drain potential of the MOS transistor T7 lowers below that of the MOS transistor T8. When the transfer gates BTGb and BTGa conduct in response to the signals φBY and φTRBra, the drains of these MOS transistors T7 and T8 are connected to the latch circuit BLCHr. Since the potential of the drain node of the MOS transistor T7 is lower than the potential of the drain node of the MOS transistor T8, an output signal of the invertor circuit IV8 is driven to a high level, this output signal is fed back by the invertor circuit IV9, and the drain node potentials of these MOS transistors T7 and T8 are amplified and latched by the latch circuit BLCHr.

When the multiplexer BMUr selects this latch amplifier circuit BLAra in response to the selection signal φBSEL, the high-level output signal of the invertor circuit IV8 is transmitted to the selection gate BSGr. When the group selection signal φBgr is brought into an active state, a high-level signal from the multiplexer BMUr is transmitted to the bus line DBBj through the selection gate BSGr.

The latch amplifier circuit BLAw latches the signal on the bus line DBBj and forms complementary signals for transmission to the signal lines BUia and ZBUia. The latch amplifier circuit BLAw includes a multiplexer BMUw selecting one of the output signal of the multiplexer BMUr and the signal on the bus line DBBj, a transfer gate BTGw made conductive in response to a group selection signal φBgw for transmitting an output signal of the multiplexer BMUw, a latch circuit BLCHw latching the signal transmitted from the transfer gate BTGw, and a selection gate BSGw made conductive in response to transfer instruction signal φTRBw for transmitting the signal latched by the latch circuit BLCHw to the signal lines BUia and ZBUia.

The multiplexer BMUw includes a selection circuit BMGa selecting one of the output signal of the multiplexer BMUr and the signal on the bus line DBBj, and a selection circuit BMGb inverting each of the output signal of the multiplexer BMUr and the signal of the data line DBBj and selecting one of the inverted signals. As an example, the selection circuit BMGa includes an n-channel MOS transistor T9a transmitting the output signal of the multiplexer BMUr, and a p-channel MOS transistor T10a transmitting the signal on the bus line DBBj. A selection signal φBsrw is supplied to the gates of these MOS transistors T9a and T10a. The selection circuit BMGb includes an invertor circuit IV10 inverting the output signal of the multiplexer BMUr, an invertor circuit IV11 inverting the signal on the bus line DBBj, an n-channel MOS transistor T9b transmitting an output signal of the invertor circuit IV10, and a p-channel MOS transistor T10b transmitting an output signal of the invertor circuit IV11. The selection signal φBsrw is supplied to the gates of the MOS transistors T9b and T10b. The selection circuits BMGa and BMGb may include CMOS transmission gates or tri-state buffers in place of the MOS transistors. They may simply have a function of selecting one of the signal from the multiplexer BMUr and the signal on the bus line DBBj in accordance with the selection signal φBsrw.

The transfer gate BTGw includes a transfer gate transistor pair provided for the respective selector circuits BMGa and BMGb. The latch circuit BLCHw includes an invertor circuit IV12 having an input connected to an output node of the selection circuit BMGa through the transfer gate BTGw, and an invertor circuit IV13 having an input connected to an output node of the selection circuit BMGb through the transfer gate BTGw.

The selection gate BSGw includes a transfer gate transistor pair which conduct in response to the transfer instruction signal φTRBw for transmitting output signals of the respective invertor circuits IV12 and IV13 to the signal lines ZBUia and BUia. The operation is now briefly described.

In accordance with the selection signal φBsrw, the multiplexer BMUw selects one of the signal outputted from the multiplexer BMUr and the bus line DBBj. Then, the group selection signal φBgw is brought into an active state, and an output signal of the multiplexer BMUw is latched by the latch circuit BLCHw. This group selection signal φBgw is supplied in common to bus interface unit circuits of 16 bits, so that respective bits on DB bus of 16 bits are latched. Then, the transfer instruction signal φTRBw is brought into an active state, and selection gates BSGw of 128 bits are brought into conducting states in the bus interface unit (BIU), so that latched signals of the corresponding latch circuits BLCHw are transmitted to the signal lines BUia and ZBUia.

When the signal of the bus line DBBj is selected and the signal of this bus line DBBj is at a high level, for example, this high-level signal is latched by the latch circuit BLCHw through the multiplexer BMUw and the transfer gate BTGw. In this state, the output signal of the invertor circuit IV12 is at a low level, and the output signal of the invertor circuit IV13 is at a high level. When the selection gate BSGw conducts, therefore, the high-level signal is transmitted to the signal line BUia, and the low-level signal is transmitted to the signal line ZBUia.

The multiplexer BMUw is provided in order to implement a "copyback" operation for storing information temporarily read from the DRAM back in the DRAM again.

When DB bus includes separately provided signal output bus and signal input bus, the selection gate BSGr is connected to the output bus, and the latch amplifier circuit BLAw is connected to the signal input bus.

(4) Structure of DRAM 26

Figure 12:
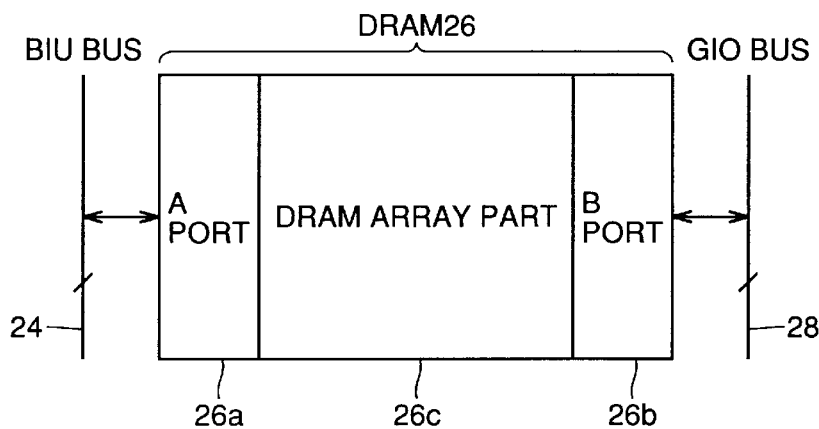
FIG. 12 is a diagram schematically showing the structure of a DRAM shown in FIG. 3.

FIG. 12 is a diagram schematically showing the structure of the DRAM 26 shown in FIG. 3 and FIG. 4. Referring to FIG. 12, the DRAM 26 includes an A port 26a connected to the BIU bus 24, a B port 26b connected to the GIO bus 28, and a DRAM array part 26c accessible through the A port 26a and the B port 26b. The DRAM array part 26c includes dynamic memory cells arranged in a matrix form, a sense amplifier amplifying and latching information of a selected memory cell, a precharge circuit precharging each column (bit line pair) at a prescribed potential in a standby cycle, and others. Each of the A port 26a and the B port 26b includes a row decoder selecting a row of the DRAM array part, a column decoder selecting a column of the DRAM array part, and a peripheral control circuit generating a control signal driving the DRAM array part to a selected state.

The A port 26a and the B port 26b can be brought into an active state independently of each other (under control from a memory controller which is not shown). The structure of this DRAM 26 may be similar to the structure of a general two-port memory. Due to the structure of driving the A port 26a and the B port 26b independently of each other, information can be transferred between the BIU bus 24 and the GIO bus 28 while employing the DRAM array part 26c as a buffer. More specifically, the A port 26a and the B port 26b bring the same row and column of the DRAM array part 26c into selected states, and one operates in an information write mode while the other operates in an information read mode in accordance with a direction of the information transfer. An information store operation into the DRAM array part 26c and information transfer between the BIU bus 24 and the GIO bus 28 can be simultaneously executed.

The SRAM 34 is identical to a general SRAM, and includes an address buffer, a row decoder, a column decoder and an SRAM cell matrix. Namely, this SRAM 34 has the same internal structure as an SRAM (chip) formed as a discrete device.

(5) Structure of Bidirectional Transfer Gate

Figure 13:
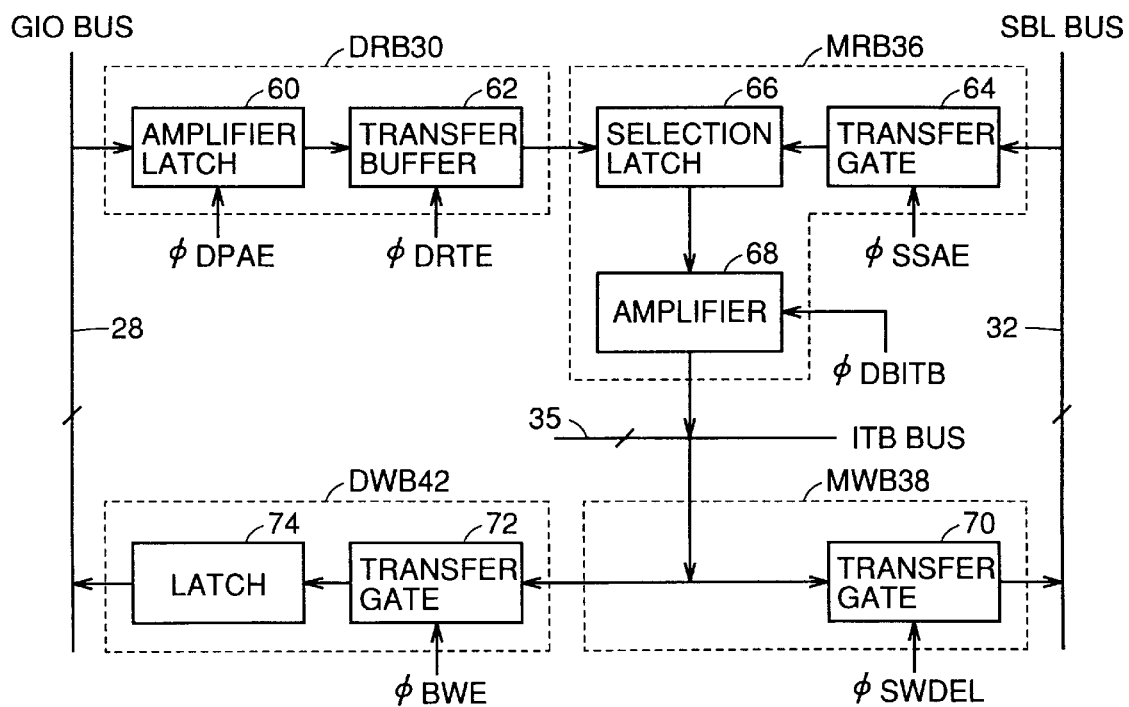
FIG. 13 is a diagram schematically showing the structure of a bidirectional transfer circuit part shown in FIG. 3.

FIG. 13 is a block diagram schematically showing the structure of a transfer part for performing data transfer between the GIO bus 28, the SBL bus 32 and the ITB bus 35. Referring to FIG. 13, the DRAM read buffer (DRB) 30 transferring the information supplied through the GIO bus 28 includes an amplifier latch 60 activated in response to activation of a preamplifier activation signal φDPAE for amplifying and latching an information signal transmitted onto the GIO bus 28, and a transfer buffer 62 transferring the information latched by the amplifier latch 60 to the memory read buffer (MRB) 36 in response to activation of a transfer instruction signal φDRTE. This transfer buffer 62, which has a buffering function, may simply be a gate such as a CMOS transmission gate.

The memory read buffer (MRB) 36 includes a transfer gate 64 activated in response to activation of a transfer operation activation signal φSSAE for transferring the information transmitted from the SRAM onto the SBL bus 32, a selection latch 66 selectively latching information transferred from the DRAM read buffer (DRB) 30 and the transfer gate 64, and an amplifier 68 amplifying the information signal latched by the selection latch 66 for outputting to the ITB bus 35 and/or the memory write buffer (MWB) 38 in response to activation of a bus transfer enable signal φDBITB.

Since only one of the transfer buffer 62 and the transfer gate 64 is brought into an active state at a time (which is described later), the selection latch 66 latches the information from this transfer buffer 62 or transfer gate 64 which is in the active state. The output signals of the transfer buffer 62 and the transfer gate 64 are reset at prescribed potential levels in inactivation thereof.

The memory write buffer (MWB) 38 transfers the information supplied on the ITB bus 35 to the SBL bus 32 in response to activation of a write decode enable signal φSWDEL. This write decode enable signal φSWDEL starts an address decode operation of the SRAM. A bus line between this transfer gate 70 and the ITB bus 35 is utilized as a latch. This is because an input part of this transfer gate 70 is held in a determinant signal state by the output signal of the amplifier 68 or the data register (DR) in inactivation of the transfer gate 70.

The DRAM write buffer (DWB) 42 includes a transfer gate 72 brought into an active state in response to activation of a buffer write enable signal φBWE for transferring information supplied through the memory write buffer (MWB) 38, and a latch 74 latching the information transferred from the transfer gate 72 for transmission onto the GIO bus 28. The transfer gate 72 is directly connected to the ITB bus 35 through a bus line.

By simply configuring a part implementing a latch function only by a bus line in the memory write buffer (MWB) 38, it is not necessary to further provide a transfer gate for performing transfer to the DRAM write buffer (DWB) 42 in addition to the transfer gate 70 transferring the information to the SBL bus 32 in this memory write buffer (MWB) 38, it is not necessary to provide a latch circuit, and the occupying area and power consumption of this memory write buffer (MWB) 38 are reduced.

As shown in FIG. 13, information can be transferred at a high speed with no collision of data and with no signal loss by providing the latch function and the amplifying function as well as the transfer gate with each transfer buffer.

In this FIG. 13, the signals φDRTE, φSSAE, φDBITB, φBWE and φSWDEL excluding the preamplifier enable signal φDPAE are generated from the SRAM memory controller controlling access to the SRAM described later, on the basis of commands from the processor. The DRAM preamplifier enable signal φDPAE supplied to the amplifier latch 60 of the DRAM read buffer (DRB) 30 is generated from a DRAM memory controller controlling the operations of the DRAM and the bus interface unit (BIU).

By generating these control signals (excluding the signal φDPAE) from the SRAM controller, information can be transferred at a correct timing with no collision of the information.

[Structure of DRAM Read Buffer (DRB) 30]

Figure 14:
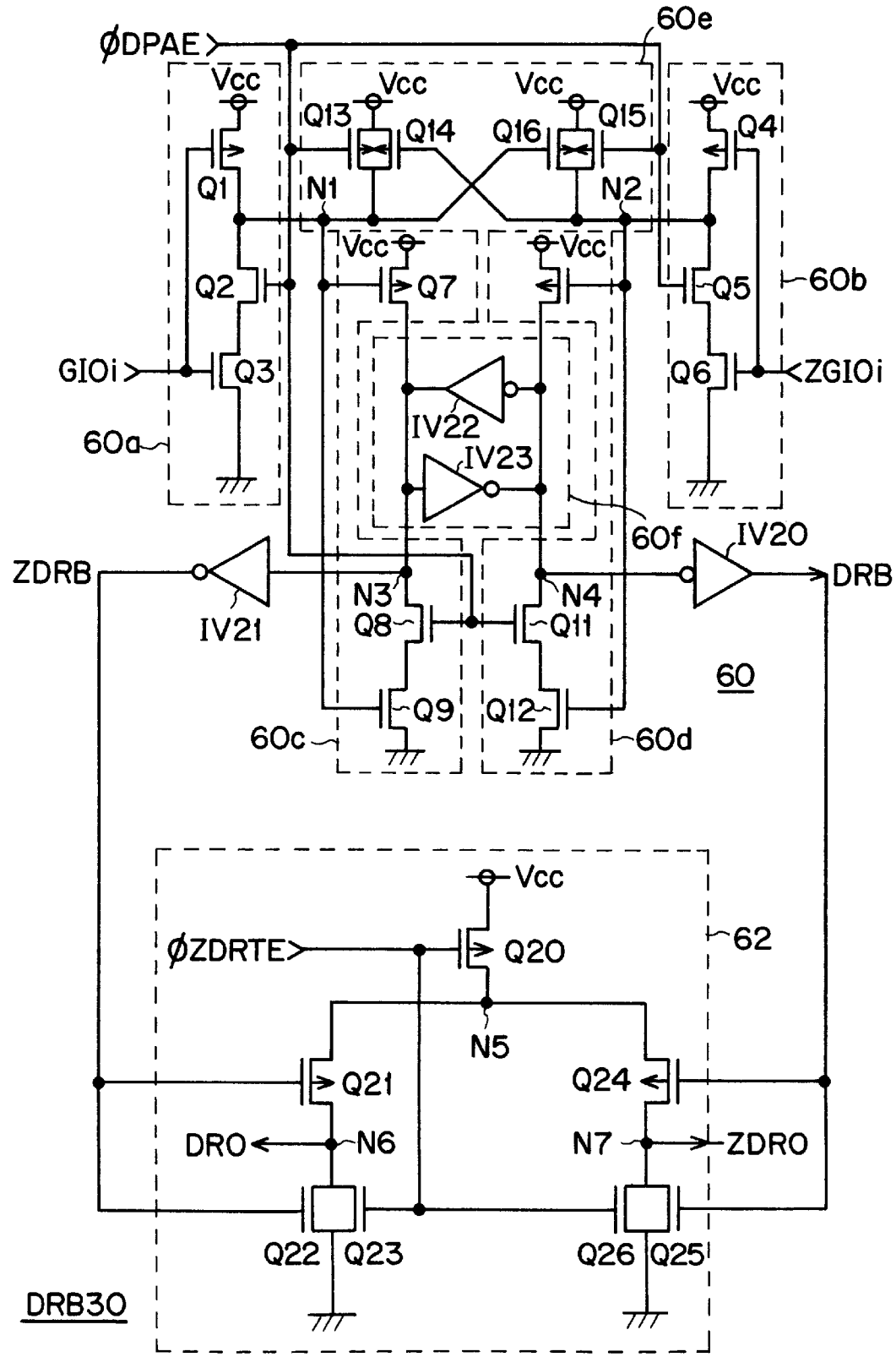
FIG. 14 is a diagram showing the structure of a 1-bit part of a DRAM read buffer shown in FIG. 13.

FIG. 14 is a diagram showing an exemplary structure of the DRAM read buffer (DRB) 30 shown in FIG. 13. The structure of a 1-bit portion of DRAM read buffer is shown in FIG. 14.

Referring to FIG. 14, the amplifier latch 60 includes an invertor buffer 60*a* activated in response to activation of the preamplifier enable signal φDPAE for inverting and amplifying a signal on a GIO bus line GIOi, an invertor buffer 60*b* activated in response to activation of the preamplifier enable signal φDPAE for inverting and amplifying a signal on a GIO bus line ZGIOi, an invertor buffer 60*c* activated in response to activation of the preamplifier enable signal φDPAE for further amplifying an output signal of the invertor buffer 60*a*, an invertor buffer 60*d* activated in response to activation of the preamplifier enable signal φDPAE for further amplifying an output signal of the invertor buffer 60*b*, a differential amplifier circuit 60*e* activated in response to activation of the preamplifier enable signal φDPAE for differentially amplifying and latching the output signals of the invertor buffers 60*a* and 60*b*, a latch circuit 60*f* latching the output signals of the invertor buffers 60*a* and 60*b*, and invertor circuits IV20 and IV21 inverting and outputting the latched signals of the latched circuit 60*f* respectively.

Complementary signals DRB and ZDRB from the invertor circuits IV20 and IV21 are supplied to the transfer buffer 62.

The GIO bus lines GIOi and ZGIOi are signal lines complementary to each other, and form a 1-bit bus line.

The invertor buffer 60*a* includes a p-channel MOS transistor Q1 connected between a power supply node Vcc and a node N1 with a gate thereof connected to the GIO bus line GIOi, and n-channel MOS transistors Q2 and Q3 serially connected between the node N1 and a ground node. The preamplifier enable signal φDPAE is supplied to the gate of the MOS transistor Q2. The gate of the MOS transistor Q3 is connected to the GIO bus line GIOi. The invertor buffer 60*b* includes a p-channel MOS transistor Q4 connected between a power supply node Vcc and a node N2 with a gate thereof connected to the GIO bus line ZGIOi, and n-channel MOS transistors Q5 and Q6 serially connected between the node N2 and a ground node. The preamplifier enable signal φDPAE is supplied to the gate of the MOS transistor Q5. The gate of the MOS transistor Q6 is connected to the GIO bus line GIOi.

The invertor buffer 60*c* includes a p-channel MOS transistor Q7 connected between a power supply node Vcc and a node N3 with a gate thereof connected to the node N1, and n-channel MOS transistors Q8 and Q9 connected between the node N3 and a ground node. The preamplifier enable signal φDPAE is supplied to the gate of the MOS transistor Q8. The gate of the MOS transistor Q9 is connected to the node N1.

The invertor buffer 60*d* includes a p-channel MOS transistor Q10 connected between a power supply node Vcc and a node N4 with a gate thereof connected to the node N2, and n-channel MOS transistors Q11 and Q12 serially connected between the node N4 and a ground node. The preamplifier enable signal φDPAE is supplied to the gate of the MOS transistor Q11. The gate of the MOS transistor Q12 is connected to the node N2.

The latch circuit 60*f* includes an invertor circuit IV22 inverting a signal potential on the node N4 and transmitting the same to the node N3, and an invertor IV23 inverting a signal on the node N3 and transmitting the same to the node N4.

The differential amplifier circuit 60*e* includes a p-channel MOS transistor Q13 connected between a power supply node Vcc and the node N1 and receiving the preamplifier enable signal φDPAE on a gate thereof, a p-channel MOS transistor Q14 connected between a power supply node Vcc and the node N1 with a gate thereof connected to the node N2, a p-channel MOS transistor Q15 connected between a power supply node Vcc and the node N2 and receiving the preamplifier enable signal φDPAE on a gate thereof, and a p-channel MOS transistor Q16 connected between a power supply node Vcc and the node N2 with a gate thereof connected to the node N1. The MOS transistors Q14 and Q16 are cross-coupled with each other, and raise a high-level potential on the node N1 or N2 to a power supply potential Vcc (the node and the voltage are denoted by the same symbol). The operation of this amplifier latch 60 is now described.

The GIO bus lines GIOi and ZGIOi are precharged at high levels in the standby cycle. When the preamplifier enable signal φDPAE is at a low level, the MOS transistors Q2 and Q5 are in OFF states, and the invertor buffers 60a and 60b are in output high impedance states.

In the differential amplifier circuit 60e, the MOS transistors Q13 and Q15 are in ON states in accordance with the low-level preamplifier enable signal φDPAE, and the nodes N1 and N2 are precharged at the power supply potential Vcc level. These nodes N1 and N2 are at high levels, and the MOS transistors Q7 and Q10 are both in OFF states. Further, the preamplifier enable signal φDPAE is at the low level, and the MOS transistors Q8 and Q11 are in OFF states. In this state, the latch circuit 60f latches information in a precedent cycle, and signals in the precedent cycle are sustainingly outputted from the invertor circuits IV20 and IV21.

When the preamplifier enable signal φDPAE rises to a high level, the MOS transistors Q2 and Q5 enter ON states, the invertor buffers 60a and 60b are brought into operating states, and the signals of the GIO bus lines GIOi and ZGIOi are inverted and amplified to be transmitted to the nodes N1 and N2 respectively. In the differential amplifier circuit 60e, the MOS transistors Q13 and Q14 are brought into OFF states, and the signal potentials transmitted onto these nodes N1 and N2 are further differentially amplified by the MOS transistors Q14 and Q16. Now, consider such a case that a high-level signal is transmitted onto the GIO bus line GIOi and a low-level signal is transmitted to the GIO bus line ZGIOi. In this state, the node N1 is at a low level, while the node N2 maintains a high level. The MOS transistor Q16 enters an ON state in accordance with the low level of the node N1, and maintains the node N2 at the power supply potential Vcc level. On the other hand, the MOS transistor Q14 is brought into an OFF state, and the potential level of the node N1 lowers.

The conductance of the MOS transistor Q7 increases in accordance with this potential change of the nodes N1 and N2, while the MOS transistor Q10 maintains an OFF state. Thus, a current is supplied from the power supply node Vcc toward the node N3 through the MOS transistor Q7. Further, the MOS transistors Q8 and Q11 enter ON states, and the node N4 is discharged through the MOS transistors Q11 and Q12 (the potential of the node N2 is at a high level). On the other hand, the MOS transistor Q9 is in an OFF state, since the potential of the node N1 is at a low level. Thus, the output signals of the invertor buffers 60c and 60d change at a high speed, and the output signals of the invertor buffers 60c and 60d are latched by the latch circuit 60f.

In this state, the node N3 attains a high level, and the node N4 attains a low level. Signals on these nodes N3 and N4 are inverted and amplified by the invertor circuits IV21 and IV20 for transmission.

By utilizing these invertor buffers and the differential amplifier circuit, small potential change of the GIO bus lines GIOi and ZGIOi is amplified at a high speed. By the invertor circuits IV22 and IV23 of the latch circuit 60f, the potentials of the nodes N3 and N4 are changed and latched at a high speed, and information transfer at a high speed is enabled.

The transfer buffer 62 includes a p-channel MOS transistor Q20 connected between a power supply node Vcc and a node N5 and receiving the read transfer enable signal φDRTE on a gate thereof, a p-channel MOS transistor Q21 connected between the node N5 and a node N6 and receiving the output signal ZDRB of the amplifier latch 60, an n-channel MOS transistor Q22 connected between the node N6 and a ground node and receiving the signal ZDRB on a gate thereof, an n-channel MOS transistor Q23 connected between the node N6 and a ground node and receiving the read transfer enable signal φDRTE on a gate thereof, a p-channel MOS transistor Q24 connected between the node N5 and a node N7 and receiving the output signal DRB of the amplifier latch 60 on a gate thereof, an n-channel MOS transistor Q25 connected between the node N7 and a ground node and receiving the signal DRB on a gate thereof, and an n-channel MOS transistor Q26 connected between the node N7 and a ground node and receiving the read transfer enable signal φDRTE on a gate thereof.

Signals DRO and ZDRO complementary to each other are outputted from the nodes N6 and N7, and supplied to the selection latch 66 of the memory read buffer (MRB) 36. The operation is now briefly described.

When the read transfer enable signal φZDRTE is at a high level of an inactive state, the MOS transistor Q20 is in an OFF state, and the MOS transistors Q23 and Q26 are in ON states. In this state, the nodes N6 and N7 are fixed at the ground potential level through the MOS transistors Q23 and Q26.

When the read transfer enable signal φZDRTE is brought into an active state of a low level, the MOS transistors Q23 and Q26 enter OFF states, the MOS transistor Q20 enters an ON state, and the power supply potential Vcc is transmitted to the node N5. Thus, the MOS transistors Q21 and Q22 operate as a CMOS invertor, and invert the output signal ZDRB from the amplifier latch 60 to generate the signal DRO. Further, the MOS transistors Q24 and Q25 operate as a CMOS invertor, and invert the output signal DRB from the amplifier latch 60 to generate the signal ZDRO.

By implementing the two-stage latch and amplifier transfer structure with this amplifier latch 60 and the transfer buffer 62, amplified, latched and stabilized information is reliably transmitted to a circuit at a next stage. By providing the latch, further, information can be successively correctly transferred every clock cycle (transfer cycle).

[Structure of Memory Read Buffer (MRB)]

Figure 15:
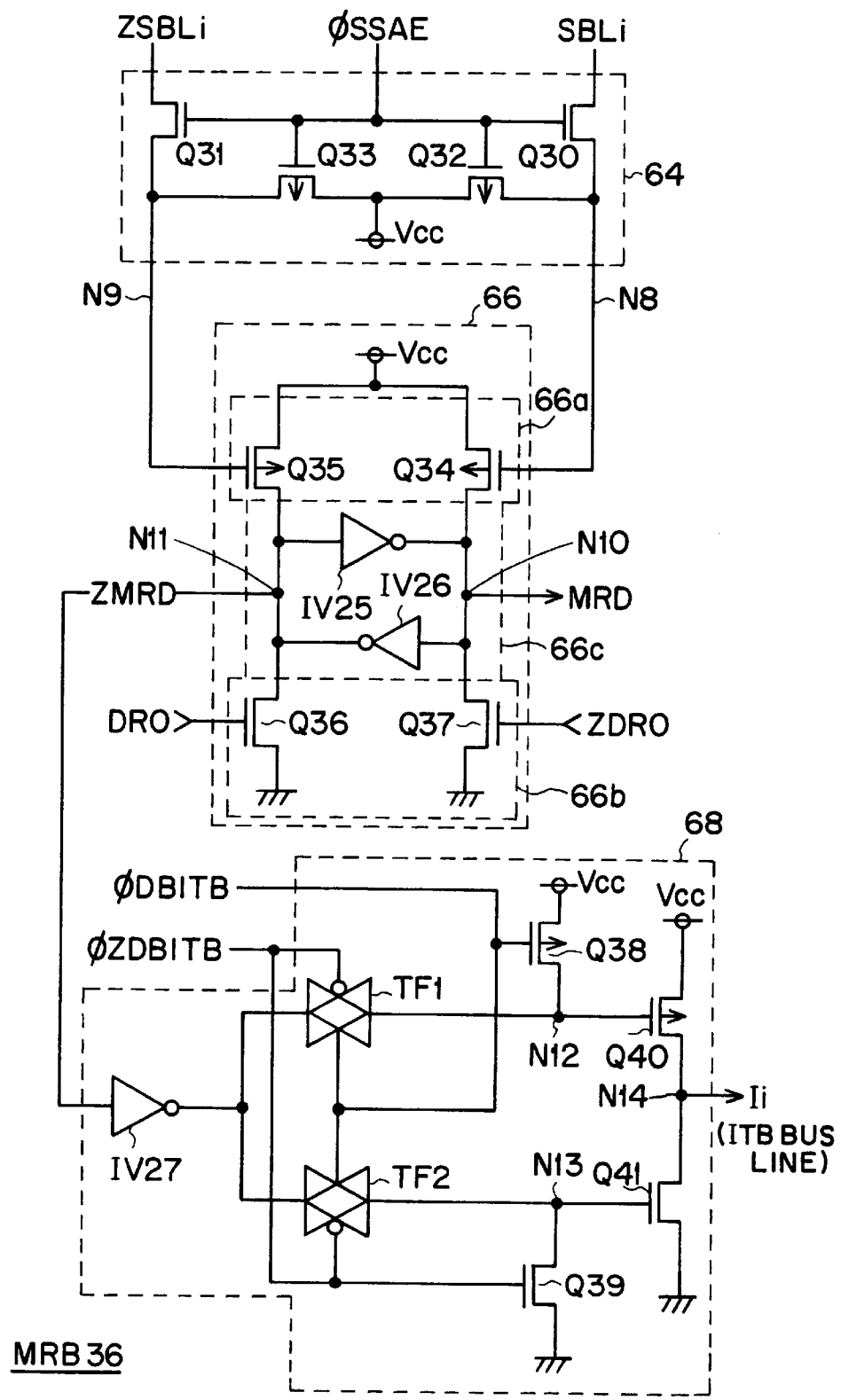
FIG. 15 is a diagram showing the structure of a 1-bit part of a memory read buffer shown in FIG. 13.

FIG. 15 is a diagram showing an exemplary structure of the memory read buffer (MRB) 36 shown in FIG. 13. The structure of a 1-bit part of the memory read buffer (MRB) 36 is shown in FIG. 15.

Referring to FIG. 15, the transfer gate 64 includes n-channel MOS transistors Q30 and Q31 which conduct in response to activation of the SRAM transfer enable signal φSSAE for transmitting signals on SBL bus lines SBLi and ZSBLi to the nodes N8 and N9 respectively, and p-channel MOS transistors Q32 and Q33 which conduct in inactivation of the SRAM transfer enable signal φSSAE for transmitting the power supply potential Vcc to the nodes N8 and N9. The bus lines SBLi and ZSBLi are complementary signal lines, and form a 1-bit SBL bus line.

The selection latch 66 includes a differential amplifier circuit 66a differentially amplifying the complementary signals transferred from this transfer gate 64 onto the nodes N8 and N9, a differential amplifier circuit 66b differentially amplifying the complementary signals DRO and ZDRO transmitted from the transfer buffer 62 shown in FIG. 14, and a latch circuit 66c amplifying and latching an output signal from one of the differential amplifier circuits 66a and 66b.

The differential amplifier circuit 66a includes a p-channel MOS transistor Q34 connected between a power supply node Vcc and a node N10 with a gate thereof connected to the node N8, and a p-channel MOS transistor Q35 connected between a power supply node Vcc and a node N11 with a gate thereof connected to the node N9. The differential amplifier circuit 66b includes an n-channel MOS transistor Q36 connected between the node N11 and a ground node and receiving the output signal DRO from the transfer buffer 62 on a gate thereof, and an n-channel MOS transistor Q37 connected between the node N10 and a ground node and receiving the output signal ZDRO from the transfer buffer 62 on a gate thereof.

The latch circuit 66c includes an invertor circuit IV25 inverting a signal on the node N11 for transmission to the node N10, and an invertor circuit IV26 inverting a signal on the node N10 for transmission to the node N11. The operation of this selector latch 66 is now described.

An operation in a case of latching the signal from the transfer gate 64 is first described. In this transfer operation, the transfer buffer 62 shown in FIG. 14 is in an inactive state, and its output signals DRO and ZDRO are both at low levels. Therefore, the MOS transistors Q36 and Q37 in the differential amplifier circuit 66b are both in OFF states. When the SRAM transfer enable signal φSSAE is at a low level of an inactive state, the nodes N8 and N9 are precharged at the power supply potential Vcc level by the MOS transistors Q32 and Q33, and the MOS transistors Q34 and Q35 in the differential amplifier circuit 66a are both in OFF states. In this state, the latch circuit 66c holds a precedent state.

When the SRAM transfer enable signal φSSAE is brought into a high level of an active state, the MOS transistors Q32 and Q33 enter OFF states, precharging of the nodes N8 and N9 completes, and the signals on the bus signal lines SBLi and ZSBLi of the SBL bus are transmitted to the nodes N8 and N9. Signals appearing on these nodes N8 and N9 are complementary signals. When a high-level signal is transmitted onto the node N8, the MOS transistor Q34 is in an OFF state, while the MOS transistor Q35 has a conductance reduced to shift to an ON state. Thus, the node N11 is supplied with a current from the power supply node Vcc, and the potential of the node N11 increases.

If the current drivability of the MOS transistors Q34 and Q35 is sufficiently larger than the current drivability of the invertor circuits IV25 and IV26, the output signal of the invertor circuit IV25 lowers to a low level, the node N11 is driven to a high level of the power supply potential Vcc level and the node N10 is driven to a low level of the ground potential at a high speed and latched in accordance with the potential increase of this node N11. Thus, a high-level signal ZMRB is outputted from the node N11, and a low-level signal is outputted from the node N10.

In a case of transferring the output signals DRO and ZDRO from the transfer buffer 62, the following operation is performed. In this state, the SRAM transfer enable signal φSSAE is at a low level of an inactive state, the nodes N8 and N9 are both at high levels, and the MOS transistors Q34 and Q35 of the differential amplifier circuit 66a are both in OFF states. The output signals DRO and ZDRO are at low levels of inactive states, and the MOS transistors Q36 and Q37 are in OFF states. The latch circuit 66c holds a precedent state in this state.

When the signals DRO and ZDRO are outputted from the transfer buffer 62 (see FIG. 14), the potential levels of the MOS transistors Q36 and Q37 change. When the signal DRO is at a high level, the conductance of the MOS transistor Q36 becomes larger than the conductance of the MOS transistor Q37. If the current drivability of the MOS transistors Q36 and Q37 is sufficiently larger than the current drivability of the invertor circuits IV25 and IV26, the node N11 is discharged to the ground potential level through the MOS transistor Q36.

Due to this potential reduction of the node N11, the potentials of the nodes N11 and N10 are latched at a low level and a high level respectively at a high speed by the invertor circuits IV25 and IV26. By making the current drivability of the MOS transistors Q34, Q35, Q36 and Q37 greater than the current drivability of the invertor circuits IV25 and IV26 the signals transferred from the transfer gate 64 and the transfer buffer 62 (see FIG. 14) are reliably amplified and latched. By providing the differential amplifier circuits 66a and 66b between the latch nodes N10 and N11 of the latch circuit 66c, and the power supply node Vcc and the ground node respectively and driving the respective ones in accordance with the output signals of the transfer gate 64 and the transfer buffer 62, it is possible to reliably selectively amplify and latch these output signals of the transfer gate 64 and the transfer buffer 62 without requiring a circuit such as a multiplexer.

The amplifier 68 drives the ITB bus line Ii in accordance with the output signal of the invertor circuit IV27 inverting an output signal ZMRD of the selection latch 66. This amplifier 68 includes CMOS transmission gates TF1 and TF2 made conductive in activation of bus line transfer enable signals φDBITB and φZDBITB for transmitting the output signal of the invertor circuit IV27 to nodes N12 and N13 respectively, a p-channel MOS transistor Q38 connected between a power supply node Vcc and the node N12 and receiving the bus transfer enable signal φDBITB on a gate thereof, an n-channel MOS transistor Q39 connected between the node N13 and a ground node and receiving the bus transfer enable signal φZDBITB on a gate thereof, a p-channel MOS transistor Q40 connected between a power supply node Vcc and an output node N14 with a gate thereof connected to the node N12, and an n-channel MOS transistor Q41 connected between the output node N14 and a ground node with a gate thereof connected to the node N13. The operation of this amplifier 68 is now briefly described.

In inactivation of the bus transfer enable signals φDBITB and φZDBITB, the CMOS transmission gates TF1 and TF2 are both in non-conducting states. In this state, the MOS transistor Q38 charges the node N12 to the power supply potential Vcc level and maintains the MOS transistor Q40 in an OFF state in response to the bus transfer enable signal φDBITB of an inactive state (low level). On the other hand, the MOS transistor Q39 holds the node N13 at the ground potential level and maintains the MOS transistor Q41 in an OFF state in response to the bus transfer enable signal φZDBITB of an inactive state (high level).

When the bus transfer enable signals φDBITB and φZDBITB are brought into active states, the MOS transistors Q38 and Q39 are brought into OFF states. At this time, the CMOS transmission gates TF1 and TF2 are brought into conducting states, and the output signal from the invertor circuit IV27 is transmitted to the nodes N12 and N13. The nodes N12 and N13 are brought into the same potential level by the output signal of the invertor circuit IV27, and one of the MOS transistors Q40 and Q41 enters a conducting state while the other one maintains a non-conducting state. Thus, a signal obtained by inverting the output signal of the invertor circuit IV27 is transmitted to the ITB bus line Ii which has theretofore been in a high impedance state. Due to the structure of bringing the amplifier 68 into an output high impedance state, no bad influence is exerted on information transfer from the memory write buffer (MWB) to the DRAM write buffer (DWB) described later.

[Structures of DRAM Write Buffer (DWB) 42 and Memory Write Buffer (MWB) 38]

Figure 16:
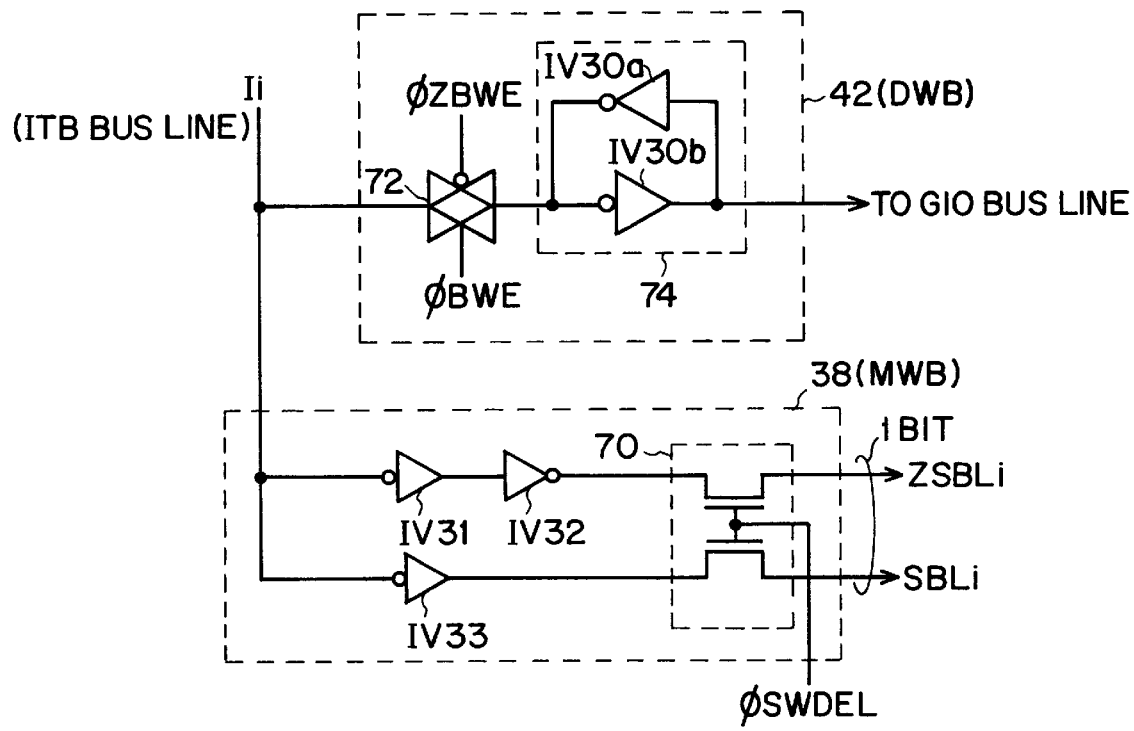
FIG. 16 is a diagram showing the structures of 1-bit parts of a DRAM writer buffer and a memory write buffer shown in FIG. 3.

FIG. 16 is a diagram specifically showing exemplary structures of the DRAM write buffer (DWB) 42 and the memory write buffer (MWB) 38 shown in FIG. 13. The structures of 1-bit portion of each of DRAM write buffer (DWB) 42 and memory write buffer (MWB) 38 are shown in FIG. 16.

Referring to FIG. 16, the transfer gate 72 of the DRAM write buffer (DWB) 42 is formed by a CMOS transmission gate which conducts in activation of the buffer write enable signals φBWE and φZBWE for transmitting the signal on the ITB bus line Ii. The latch circuit 74 includes invertor circuits IV30a and IV30b. An output signal of an invertor circuit IV30b is transmitted to the GIO bus line (GIOi). The structure of this DRAM write buffer (DWB) merely includes the gate and the latch circuit, and the DRAM write buffer (DWB) 42 is brought into a latching state in inactivation of the transfer gate 72 formed by the CMOS transmission gate. This latch circuit 74 includes the invertor circuits IV30a and IV30b, and has an amplifying function. When the transfer gate 72 conducts, the signal potential on the ITB bus line Ii is amplified and latched by the latch circuit 74 and transmitted to the GIO bus line. By providing this latch circuit 74, it is possible to correctly transmit information from the ITB bus to the GIO bus every transfer cycle.

The memory write buffer (MWB) 38 includes two stages of cascaded invertor circuits IV31 and IV32 which receive the signal potential on the ITB line Ii, an invertor circuit IV33 which is provided in parallel with the invertor circuits IV31 and IV32 and receives the signal on the ITB bus line Ii, and the transfer gate 70 which conducts in activation of the write decode enable signal φSWDEL for transmitting output signals of the invertor circuits IV32 and IV33 to the SBL bus lines ZSBLi and SBLi respectively.

The transfer gate 70 includes transfer gate transistor pair made conductive in activation of the write decode enable signal φSWDEL. In inactivation of the amplifier 68 of the memory read buffer (MRB), this amplifier 68 is brought into an output high impedance state. Therefore, the invertor circuits IV31 and IV32, and IV33 generate signals complementary to each other, and hold the signal transmitted onto this ITB bus line Ii in inactivation of the transfer gate 70. Therefore, in this memory write buffer (MWB) 38, an interconnection line part is utilized as a latch to reduce the circuit occupying area.

Due to this structure utilizing the interconnection line part as a latch, it is possible to readily implement simultaneous information transfer from the memory read buffer (MRB) 36 to the ITB bus and the memory write buffer (MWB).

[Modification 1 of Memory Read Buffer (MRB)]

Figure 17:
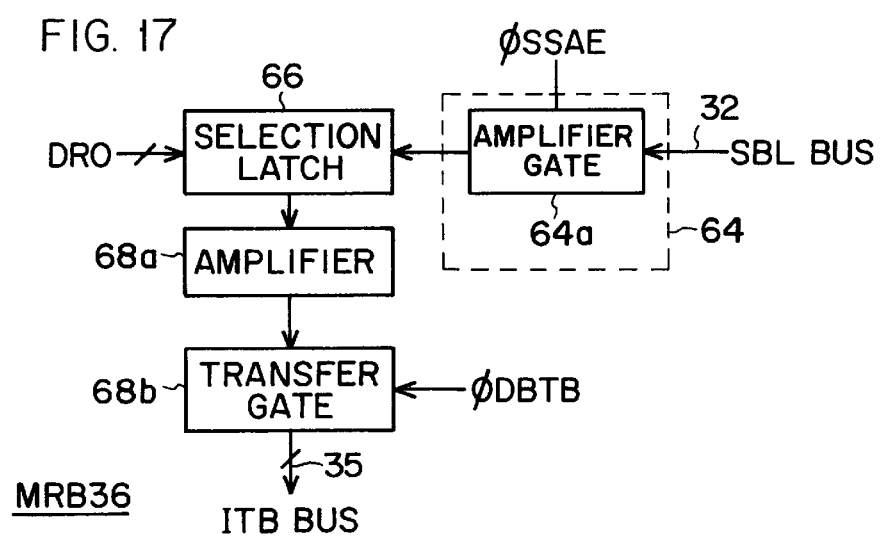
FIG. 17 is a diagram showing the structure of a modification of the memory read buffer shown in FIG. 13.

FIG. 17 is a diagram showing the structure of a modification of the memory read buffer (MRB) 36. Referring to FIG. 17, the memory read buffer (MRB) 36 includes an amplifier gate 64a activated in response to activation of the SRAM transfer enable signal φSSAE for amplifying and transferring information on the SBL bus 32, a selection latch 66 for selectively amplifying and latching one of an output signal of the amplifier gate 64a and the output signal DRO of the DRAM read buffer (DRB), an amplifier 68a amplifying an output signal of the selection latch 66, and a transfer gate 68b activated in response to activation of the bus transfer enable signal φDBITB for transferring an output signal of the amplifier 68a to the ITB bus 35.

The structure of the selection latch 66 is identical to the structure shown in FIG. 15. The amplifier gate 64a has both of a function of a transfer gate and a function as an amplifier. For example, a structure similar to the amplifier latch 60 included in the DRAM read buffer shown in FIG. 14 can be utilized as the structure of this amplifier 64a. Such a structure that the amplifiers 68a and 68b are not provided separatedly from each other but integrated latching and amplifying the output signals as shown in the precedent FIG. 15 may be employed.

In the structure shown in this FIG. 17, information on the SBL bus 32 is amplified by the amplifier gate 64a. Therefore, it is possible to reliably amplify the information on the SBL bus for transmitssion to the selection latch 66, and correct transmission of the information can be implemented.

The precedent structure shown in FIG. 15 is equivalent to such a structure that an amplifier part of this amplifier gate 64a is shared with the amplifier of the memory read buffer (MRB), and the occupied area can be reduced.

[Modification 2 of Memory Read Buffer (MRB)]

Figure 18:
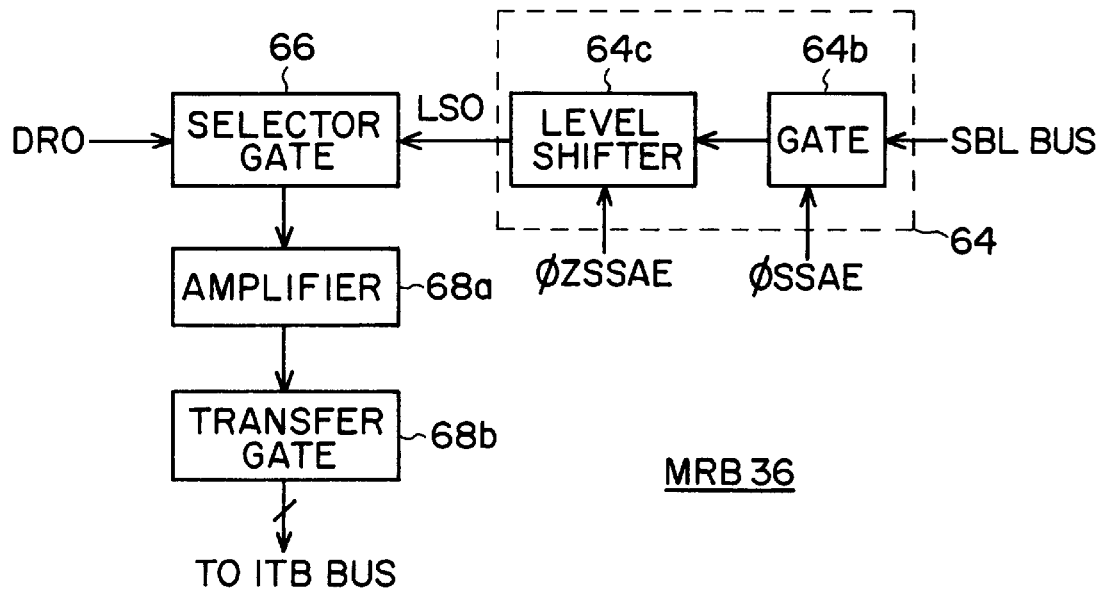
FIG. 18 is a diagram schematically showing the structure of another modification of the memory read buffer shown in FIG. 13.

FIG. 18 is a diagram showing the structure of a modification 2 of the memory read buffer (MRB). In the memory read buffer (MRB) 36 shown in FIG. 18, a transfer gate 64 includes a gate 64b transmitting the information on the SBL bus in response to activation of the SRAM transfer enable signal φSSAE, and a level shifter 64c holding the potential level of a signal from this gate 64b for transmission to a selection gate 66 in response to activation of an SRAM transfer enable signal φZSSAE.

This level shifter 64c has the ability of holding the signal level on the SBL bus, and transmits the signal potential on the SBL bus to the selection gate 66. This signal potential on the SBL bus is finally amplified by an amplifier 68a, and transmitted to the ITB bus through a transfer gate 68b. Since no large current drivability is required to the level shifter 64c, current consumption can be reduced. Further, the transistor size can also be reduced, and the circuit occupying area can be reduced.

Figure 19:
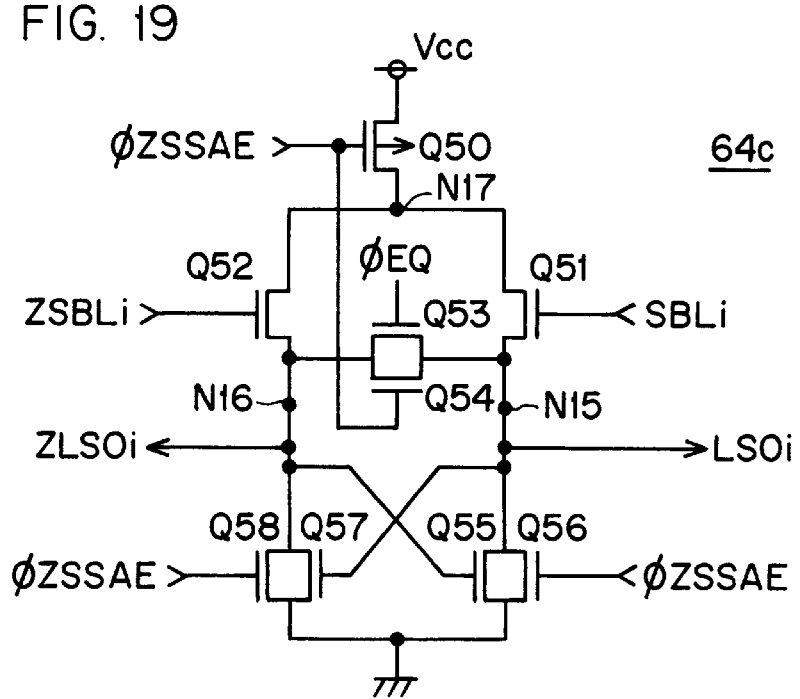
FIG. 19 is a diagram showing the structure of a 1-bit part of a level shifter shown in FIG. 18.

FIG. 19 is a diagram showing an exemplary structure of the level shifter 64c shown in FIG. 18. A 1-bit part of the level shifter is shown in FIG. 19.

Referring to FIG. 19, the level shifter 64c includes a p-channel MOS transistor Q50 connected between a power supply node Vcc and a node N17 and receiving the SRAM transfer enable signal φZSSAE on a gate thereof, an n-channel MOS transistor Q51 connected between the node N17 and a node N15 with a gate thereof connected to the SBL bus line SBLi, an n-channel MOS transistor Q52 connected between the node N17 and a node N16 with a gate thereof connected to the SBL bus line ZSBLi, an n-channel MOS transistor Q53 connected between the node N15 and the node N16 and receiving an equalize instruction signal φEQ on a gate thereof, and an n-channel MOS transistor Q54 connected between the node N15 and the node N16 and receiving the SRAM transfer enable signal φZSSAE on a gate thereof.

The SBL bus lines SBLi and ZSBLi are signal lines complementary to each other, and form a 1-bit SBL bus line. The equalize instruction signal φEQ is brought into an active state (high level) in inactivation of this memory read buffer (MRB) 64.

The level shifter 64c further includes an n-channel MOS transistor Q55 connected between the node N15 and a ground node with a gate thereof connected to the node N16, an n-channel MOS transistor Q56 connected between the node N15 and a ground node and receiving the SRAM transfer enable signal φZSSAE on a gate thereof, an n-channel MOS transistor Q57 connected between the node N16 and a ground node and having a gate connected to the node N15, and an n-channel MOS transistor Q58 connected between the node N16 and a ground node and receiving the SRAM transfer enable signal φZSSAE on a gate thereof. The nodes N15 and N16 are connected to the selection gate 66. The operation of this level shifter 64c shown in FIG. 19 is now briefly described.

When the memory read buffer (MRB) 36 is in an inactive state, the equalize instruction signal φEQ is at a high level of an active state, and the SRAM transfer enable signal φZSSAE is at a high level of an inactive state. In this state, the MOS transistor Q50 is in an OFF state, and the MOS transistors Q53 and Q54 are ON states. Thus, the potentials of the nodes N15 and N16 are equalized with each other. Further, the MOS transistors Q56 and Q58 enter ON states, the nodes N15 and N16 are both discharged to the ground potential level, and signals LSOi and ZLSOi are at low levels. Since these signals LSOi and ZLSOi are both at low levels, an operation of selecting the output signal LSO of the transfer gate 64 in the selection gate 66 is inhibited (these output signals LSOi and ZLSOi are supplied to the selection gate through the invertor).

When the memory read buffer (MRB) 36 is brought into an active state, the equalize instruction signal φEQ is brought into an inactive state (low level), and the MOS transistor Q53 is brought into an OFF state. Also in this state, the MOS transistor Q54 is still in an ON state, and the potential levels of the nodes N15 and N16 are equalized with each other. Complementary signals are transmitted onto the SBL bus lines SBLi and ZSBLi, and the conductance of the MOS transistors Q51 and Q52 changes.

In this state, the SRAM transfer enable signal φZSSAE is then brought into an active state (low level). Thus, the MOS transistor Q50 is brought into an ON state, and the node N17 is charged to the power supply potential Vcc level. Further, the MOS transistor Q54 enters an OFF state, and the equalizing operation for the nodes N15 and N16 is stopped. Thus, signal potentials according to the signal potentials of the SBL bus lines SBLi and ZSBLi are transmitted to the nodes N15 and N16 by source follower mode operations of the MOS transistors Q51 and Q52. The MOS transistors Q56 and Q58 are in OFF states.

In accordance with the potential changes of the nodes N15 and N16, the conductance of the MOS transistors Q55 and Q57 changes, and the potential level of a low-potential node out of the nodes N15 and N16 is further reduced. Since the current drivability of the MOS transistors Q55 and Q57 is not much increased, discharge of the low-potential node out of the nodes N15 and N16 to the ground potential level is stopped, and the potential thereat is held at an intermediate potential level. Thus, the signals SLOi and ZSLOi having a signal potential difference according to the signal potential difference between the SBL bus lines SBLi and ZSBLi are generated.

By utilizing the level shifter 64c, a signal having the necessary minimum signal amplitude can be transmitted to the selection gate 66, and the occupied area by this level shifter can be reduced. The selection gate 66 selects and latches the signal supplied from this level shifter 64c and supplies the same to the amplifier 68a, so that the amplifier 68a finally amplifies the signals on the SBL bus lines to a high level and a low level, for transmission to the ITB bus through the transfer gate 68b. There is no need to provide amplifiers having large current drivability on both for the SBL bus lines and for driving the ITB bus, and the circuit occupying area is reduced.

According to the embodiment 1 of the present invention, as hereinabove described, the bus interface unit, the DRAM, the SRAM and the processor (CPU) are so structured as to be connected by separate buses respectively, whereby the information can be transferred internally through the bus interface unit also in information transfer with an external device, and the information can be efficiently transferred. As to internal bus-to-bus information transfer, further, the information can be transferred from the second one to the first one during information transfer from the first one to the second one by utilizing the bidirectional transfer circuit, and efficient information transfer can be implemented.

[Embodiment 2]

Figure 20:
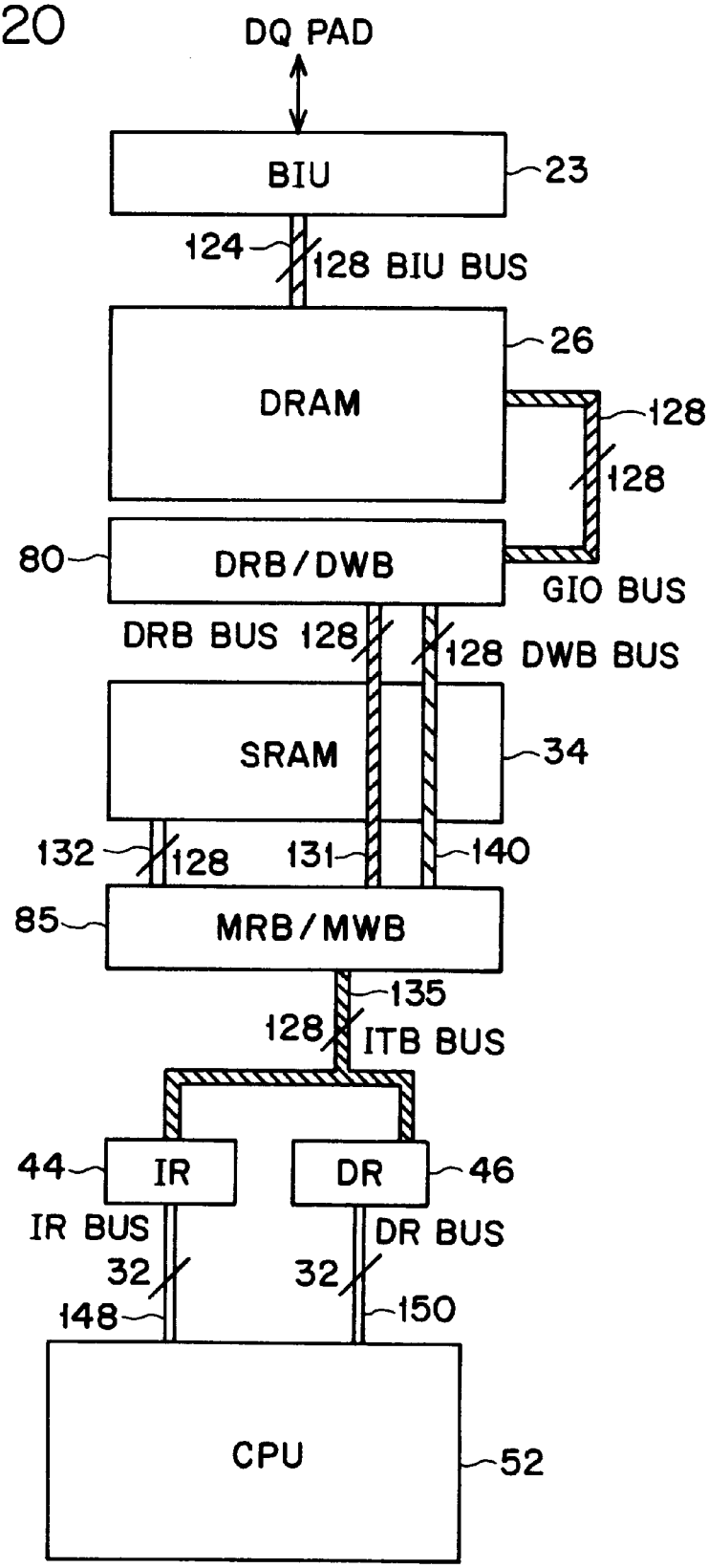
FIG. 20 is a diagram schematically showing arrangement of bus lines of a microcomputer according to an embodiment 2 of the present invention.

FIG. 20 is a diagram showing the planar layout of components of a microcomputer according to an embodiment 2 of the present invention. Referring to FIG. 20, an instruction register (IR) 44 and a data register (DR) 46 are arranged in the vicinity of a processor (CPU) 52. The instruction register (IR) 44 is connected to the processor (CPU) 52 through an IR bus 148, and the data register (DR) 46 is connected to the processor (CPU) 52 through a DR bus 150. By arranging these registers 44 and 46 in the vicinity of the processor (CPU) 52, the IR bus 148 and the DR bus 150 can be substantially linearly arranged, the lengths of these buses 148 and 150 can be shortened, both parasitic capacitance and parasitic resistance can be reduced, and instruction and data transfer at a high speed can be implemented.

A second bidirectional transfer circuit 85 is arranged in proximity to the instruction register (IR) 44 and the data register (DR) 46. This second bidirectional transfer circuit 85 includes a memory read buffer (MRB) and a memory write buffer (MWB). The second bidirectional transfer circuit 85 is connected to the instruction register (IR) 44 and the data register (DR) 46 through an ITB bus 135. This ITB bus 135 can be arranged by utilizing a region between this second bidirectional transfer circuit 85 and the registers 44 and 46 and its peripheral region. The second bidirectional transfer circuit 85 is arranged adjacently to the registers 44 and 46. Therefore, this ITB bus can also be arranged over the shortest distance. Thus, the parasitic capacitance and the parasitic resistance of the ITB bus 135 can be minimized, and high speed instructions and data (information) can be transferred. Since these ITB bus 135, IR bus 148 and DR bus 150 can be arranged over the shortest distance, a bus capable of performing information transfer corresponding to a clock frequency of about 100 MHz, for example, can be implemented.

An SRAM 34 is arranged on an opposite side to the instruction register (IR) 44 and the data register (DR) 46 with respect to the second bidirectional transfer circuit 85. An SBL bus 132 is arranged on a region between the SRAM 34 and the second bidirectional transfer circuit 85. A first bidirectional transfer circuit 80 is arranged opposing to the second bidirectional transfer circuit 85 with respect to SRAM 34. The first bidirectional transfer circuit 80 includes a DRAM read buffer (DRB) and a DRAM write buffer (DWB). The memory read buffer (MRB) included in the second bidirectional transfer circuit 85 is connected with the DRAM read buffer (DRB) included in the first bidirectional transfer circuit 80 through a DRB bus 131. The memory write buffer (MWB) included in the second bidirectional transfer circuit 85 is connected with the DRAM write buffer (DWB) included in the fist bidirectional transfer circuit 80 through a DWB bus 140. These DRB bus 131 and DWB bus 140 are arranged overlapping with the SRAM 34 in a plan view. In other words, the DRB bus 131 and the DWB bus 140 are arranged extending over the SRAM 34. The DRAM bus 131 and the DWB bus 140 are formed at an interconnection layer upper than the SBL bus 132. Also when arranging these DRB bus 131 and DWB bus 140 to extend over the SRAM 34, therefore, these bus interconnection lines 131 and 140 exert no bad influence on interconnection of the SBL bus 132.

By arranging the SRAM 34 adjacently to this second bidirectional transfer circuit 85, the SBL bus 132 between the SRAM 34 and the second bidirectional transfer circuit 85 can be made shortest, and a high-speed bus can be implemented. Further, by arranging the DRB bus 131 and the DWB bus 140 to extend over the SRAM 34, further, these DRB bus 131 and DWB 140 can be linearly arranged over the shortest distance without requiring a specific interconnection region, the parasitic capacitance and the parasitic resistance of these buses can be minimized, signal propagation delay by interconnection lines and a charge/discharge current on the buses can be both minimized (charge/discharge of the parasitic capacitance reduces), and buses of a high speed and low power consumption can be implemented.

A DRAM 26 is arranged on an opposite side to the SRAM 34 with respect to the first bidirectional transfer circuit 80. This DRAM and the first bidirectional transfer circuit 80 are connected with each other through a GIO bus 128. This GIO bus 128 is arranged on a peripheral region of the DRAM 26 and the first bidirectional transfer circuit 80. No high-speed operation is required to this GIO bus, and hence no problem arises in particular even if the slightly long GIO bus 128 is arranged in this peripheral region.

A bus interface unit (BIU) 23 is arranged opposing to the first bidirectional transfer circuit 80 with respect to this DRAM 26. The bus interface unit (BIU) 23 and the DRAM 26 are connected with each other through a BIU bus 124. This BIU bus also performs information transfer in accordance with a low-speed clock, and hence no high-speed operation is required. Therefore, no problem arises even if this BIU bus 124 somewhat lengthens.

By arranging the components of the microcomputer substantially in alignment on a straight line as shown in this FIG. 20, the bus line lengths between the respective components can be minimized, the parasitic capacitance and the parasitic resistance of the buses can be minimized, signal propagation delay by interconnection lines and the charge/discharge current for the buses can be suppressed to the minimum, and a bus arrangement transferring information at a high speed with low power consumption can be implemented.

The SBL bus 132 is arranged with no requirement for a specific interconnection region since the SRAM 34 and the second bidirectional transfer circuit 85 are adjacently arranged (the DRB bus 131 and the DWB bus 140 are at interconnection layers upper than this SBL bus).

Figure 21:
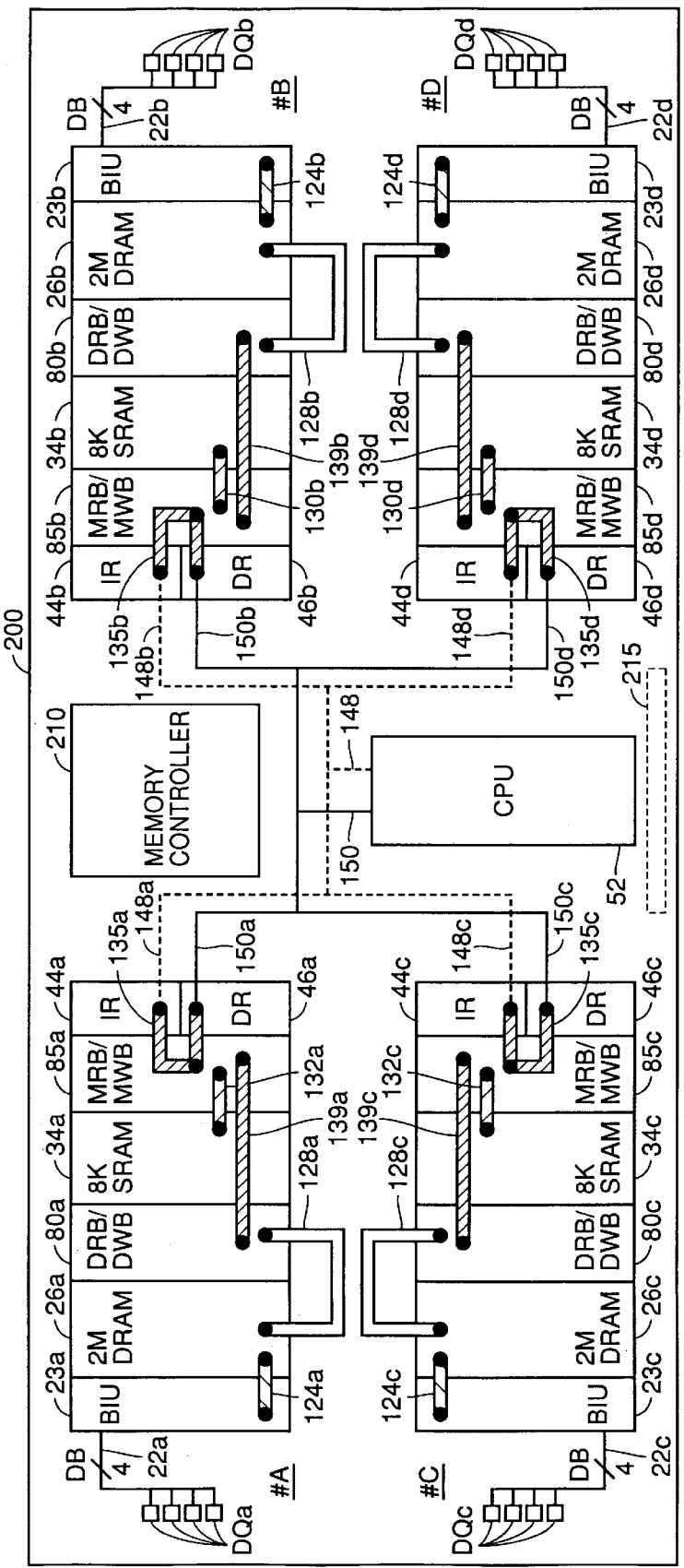
FIG. 21 is a diagram schematically showing the on-chip layout of the microcomputer according to the embodiment 2 of the present invention.

FIG. 21 is a diagram showing an exemplary chip layout of the microcomputer according to the embodiment 2 of the present invention. Referring to FIG. 21, the microcomputer having a built-in memory is formed on a semiconductor chip 200. This semiconductor chip 200 is split into four regions #A, #B, #C and #D.

In the region #A, a bus interface unit (BIU) 23a, a DRAM 26a, a first bidirectional transfer circuit (DRB/DWB) 80a, an SRAM 34a, a second bidirectional transfer circuit (MRB/MWB) 85a, an instruction register (IR) 44a and a data register (DR) 46a are arranged. The DRAM 26a has a storage capacity of 2 Mbits (512 rows by 256 columns by 16 blocks), and the SRAM 34a has a storage capacity of 8 Kbits (256 rows by 32 columns).

The bus interface unit (BIU) 23a and the DRAM 26a are interconnected with each other by a BIU bus 124a, the DRAM 26a and the first bidirectional transfer circuit 80a are interconnected with each other by a GIO bus 128a, and the first bidirectional transfer circuit 80a and the second bidirectional transfer circuit 85a are interconnected with each other by a bus 139a. This bus 139a includes both of a bus line connecting the DRAM read buffer (DRB) and the memory read buffer (MRB) and a bus line interconnecting the DRAM write buffer (DWB) and the memory write buffer (MWB).

Further, the SRAM 34a and the second bidirectional transfer circuit 85a are interconnected with each other by a bus 132a, and the second bidirectional transfer circuit 85a and the data register (DR) 46a as well as the instruction register (IR) 44a are interconnected with each other by an ITB bus 135a. The layout of the interconnection lines and the components in this region #A is identical to the layout shown in FIG. 20 except that the bit width of the buses becomes ¼ times.

DQ pads DQa of 4 bits are arranged between the bus interface unit (BIU) 23a and a shorter side edge portion of the semiconductor chip 200. The DQ pads DQa and the bus interface unit (BIU) 23a are connected with each other by a DB bus 22a.

In the chip layout shown in FIG. 21, individual components excluding the processor (CPU) 52 among the components of the microcomputer shown in FIG. 20 are split into four groups, and dispersed and arranged in the four regions #A to #D. In the respective ones of the regions #B to #D, therefore, the same components as in the region #A are arranged in the same layout (mirror-symmetrically with respect to the chip longer side center). Reference numerals identical to those of the components and the buses shown in the region #A are applied to the components in these regions #B to #D, and the regions are shown by the final characters thereof.

By configuring the components of the regions #A and #C and the elements of the regions #B and #D into mirror-symmetrical arrangement with respect to the central portion in the longer side direction of the semiconductor chip 200 as shown in this FIG. 21, if the layout of the components in one region is optimized, the components can be arranged in the optimum layout also in the remaining regions by arranging optimized layout mirror-symmetrically.

The processor (CPU) 52 and a memory controller 210 are arranged on the central portion with respect to the longer sides of the semiconductor chip 200. This memory controller 210 decodes commands from the processor (CPU), and generates various control signals shown in the precedent embodiment 1. Namely, this memory controller 210 includes a controller for the SRAM, and a controller for the DRAM and the bus interface unit (BIU).

Instruction registers (IR) 44a, 44b, 44c and 44d of the regions #A to #D are connected to the processor (CPU) 52 through the respective buses 48a, 48b, 48c and 48d, and data registers (DR) 46a, 46b, 46c and 46d are connected to the processor (CPU) 52 through the respective buses 150a, 150b, 150c and 150d.

By arranging the processor (CPU) 52 on the central portion with respect to the longer sides of the semiconductor chip 200, the interconnection line lengths of the buses 150a to 150*d* and 148*a* to 148*d* between the instruction registers as well as the data registers of the respective regions #A to #D and the processor (CPU) can be substantially equalized with each other, and region dependency of signal propagation delay in these buses can be eliminated.

By arranging DQ pads DQa to DQd between the bus interface units (BIU) 23*a* to 23*d* of the regions #A to #D and the end portions at shorter side of the semiconductor chip 200, further, the DQ pads DQa to DQd can be arranged in the vicinity of the respective bus interface units (BIU) 23*a* to 23*d*, interconnection line regions of the DB buses 22*a* to 22*d* can be reduced, and increase of the chip area can be suppressed.

By arranging the DQ pads DQa to DQd on the end portions at shorter side of the semiconductor chip 200, further, a control signal input/output pad for the processor (CPU) 52 can be arranged in the vicinity of the central region with respect to the longer sides of the semiconductor chip 200 adjacently to the processor (CPU) 52. This control input/output pad arrangement region for the processor (CPU) 52 is shown by a broken line block 215 in FIG. 21. Thus, signals can be inputted/outputted with respect to the processor (CPU) 52 with the minimum delay time, the processor (CPU) 52 can be operated at a fast timing in accordance with control signals from an exterior, signals from the processor (CPU) 52 can be outputted to the external device at a fast timing, and a microcomputer performing a high-speed operation can be implemented.

According to the embodiment 2 of the present invention, as hereinabove described, the components of the microcomputer are arranged in alignment, and the components performing transfer of information with the processor (CPU) are arranged in the vicinity of the processor (CPU), whereby the bus interconnection lines between the respective components can be substantially linearly arranged over the shortest distances, and the information can be transferred at a high speed. Thus, a microcomputer operating at a high speed can be implemented.

[Embodiment 3]

Figure 22:
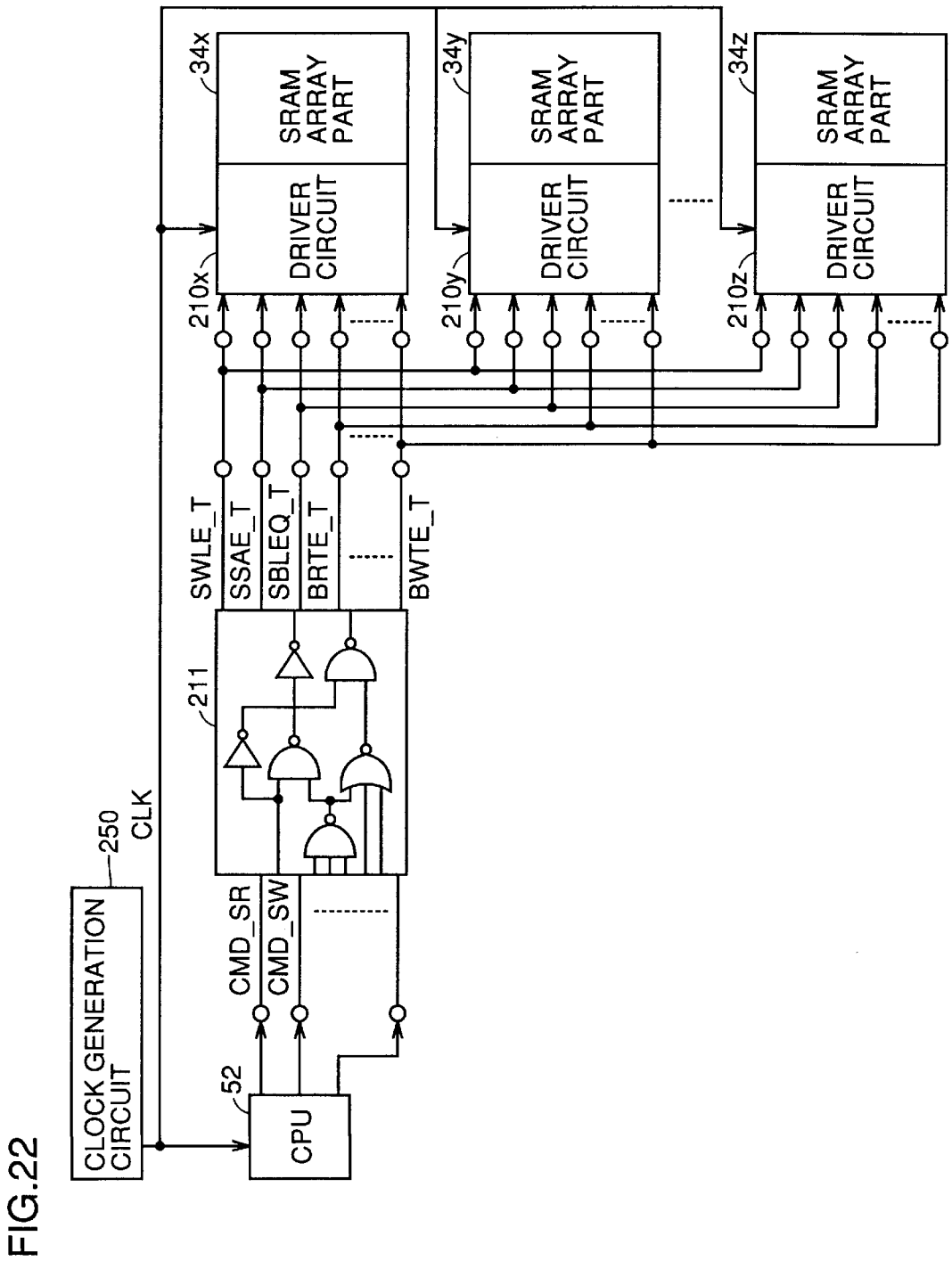
FIG. 22 is a diagram schematically showing the structure of a main part of a microcomputer according to an embodiment 3 of the present invention.

FIG. 22 is a diagram showing the structure of a main part of a microcomputer according to an embodiment 3 of the present invention. Only the structure of a part related to an SRAM is shown in FIG. 22. A plurality of SRAM array parts 26*x*, 26*y*, ..., 26*z* are arranged. Each of these SRAM array parts 26*x* to 26*z* includes a row decoder, a column decoder, a word line, a bit line, a bit line equalize circuit, and an information signal input/output circuit.

In correspondence to these SRAM array parts 26*x*, 26*y*, ... 26*z*, driver circuits 210*x*, 210*y*, ..., 210*z* operating in synchronization with a clock signal CLK from a clock generation circuit 250 are provided. The respective driver circuits 210*x* to 210*z* receive control signals from an SRAM control logic generation part 210*a* in common. This SRAM control logic generation part 210*a* decodes commands supplied from a processor (CPU) 52 asynchronously with the clock signal CLK, and brings control signals for activating operations specified by these commands into active states. While the internal structure of this SRAM control logic generation part 21*a* is shown as an example in FIG. 22, the connection mode of logic gates included therein is not restrictive in any way. It is simply required to have a function of decoding the commands from the processor (CPU) 52.

Referring to FIG. 22, further, an SRAM read command CMD-SR and an SRAM write command CMD-SW are shown as examples as the commands from the processor (CPU) 52. As the control signals from the SRAM control logic generation part 210*a*, further, an SRAM word line selection enable signal SWLE-T, an SRAM sense amplifier enable signal (SRAM data transfer enable signal) SSAE-T, an SRAM bit line equalize instruction signal SBLEQ-T and a buffer read transfer enable signal BRTE-T instructing reading and transfer of information from the SRAM, and a buffer write transfer enable signal BWTE-T instructing transfer and writing of information to and in the SRAM are shown as examples.

The processor (CPU) 52 operates in synchronization with the clock signal CLK from the clock generation circuit 250, to process instructions for generating required commands. The control signals from the SRAM control logic generation part 210*a* are supplied in common to drive circuits 210*x* to 210*z* provided in correspondence to the respective SRAM array parts 26*x* to 26*z*. When the lengths of interconnection lines from the SRAM control logic generation part 210*a* to these driver circuits 210*x* to 210*z* are different from each other, the definite timings for the control signals differ from each other in different driver circuits 210*x* to 210*z*.

The driver circuits 210*x* to 210*z* take in the signals supplied from this SRAM control logic generation part 210*a* and generate internal control signals in synchronization with an edge (leading or trailing) of the clock signal CLK supplied from the clock generation circuit 250, and drive the corresponding SRAM array parts 26*x* to 26*z*. Also when the interconnection line lengths between this SRAM control logic generation part 211*a* and the respective driver circuits 210*x* to 210*z* are different from each other, therefore, the operation timings of the respective driver circuits 210*x* to 210*z* are determined by the clock signal CLK, so that the SRAM array parts 26*x* to 26*z* can operate in parallel with each other at the same timing. These driver circuits 210*x* to 210*z* also generate control signals controlling transfer operations of bidirectional transfer gates provided in correspondence to the respective SRAM array parts 26*x* to 26*z*. Thus, there is no need to employ wide interconnection lines for minimizing interconnection line delay, and area increase by the interconnection lines can be suppressed. Further, there is no need to perform timing control by the interconnection line layout or the interconnection line structure in order to minimize the interconnection line delay, but the interconnection line layout is simplified.

Figure 23:
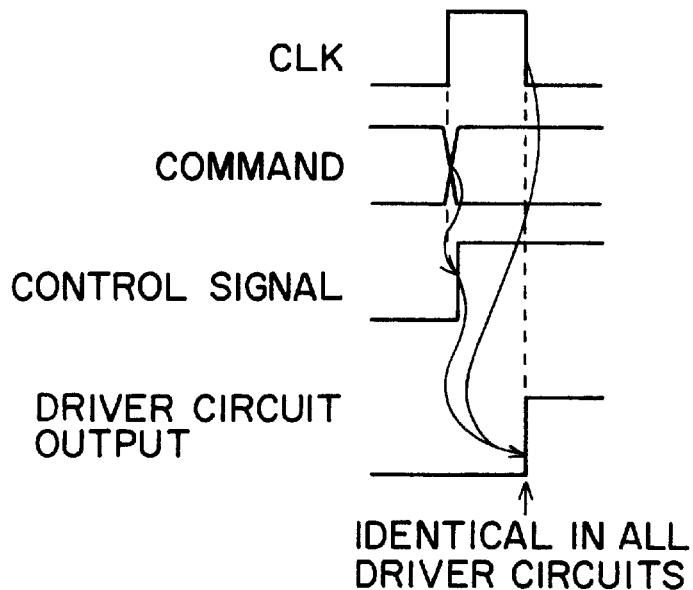
FIG. 23 is a waveform diagram representing an operation of an SRAM control part shown in FIG. 22.

FIG. 23 is a signal waveform diagram representing an operation in the arrangement shown in FIG. 22. In this FIG. 23, an operation in such a case that the processor (CPU) 52 issues a command in synchronization with the leading (rising) edge of the clock signal CLK while the driver circuits 210*x* to 210*z* take in the control signal from the SRAM control logic generation part 210*a* and generate internal control signals in synchronization with the trailing (falling) edge of this clock signal CLK is shown.

Referring to FIG. 23, the processor (CPU) executes an instruction, generates a required command, and issues this generated command in synchronization with the leading edge of the clock signal CLK for supplying to the SRAM control logic generation part 211*a*. This logic generation part 211*a* decodes the command supplied from the processor (CPU) 52 asynchronously with (independently of) the clock signal CLK, and brings a control signal required for command execution into an active state. From this SRAM control logic generation part 211*a*, therefore, a corresponding control signal is immediately brought into a definite state when the command is brought into a definite state on the leading edge of the clock signal CLK (FIG. 23 shows such a state that the control signal rises to a high level as an example).

This control signal from the SRAM control logic generation part 211a is supplied in common to the respective driver circuits 210x to 210z. The driver circuits 210x to 210z take in this control signal, generate internal control signals and drive the SRAM array parts 26x to 26z in synchronization with the trailing edge of the clock signal CLK. Therefore, all driver circuits 210x to 210z can generate the internal control signals for driving the corresponding SRAM array parts 26x to 26z at the same timing without being influenced by interconnection line delay, there is no need to provide a margin for the information transfer timing in consideration of this interconnection line delay, and high-speed information transfer can be performed.

The driver circuits 210x to 210z can also include so-called SRAM peripheral control circuit parts generating the control signals for driving the SRAM array parts 26x to 26z. The clock signal CLK from the clock generation circuit 250 is supplied in common to the driver circuits 210x to 210z. At this time, a contrivance on layout described later is made on a signal line propagating this clock signal CLK in order to reduce its interconnection line resistance, there is no delay of the clock signal CLK to the driver circuits 210x to 210z, and the clock signal CLK changes at the same timing in the driver circuits 210x to 210z.

Figure 24:
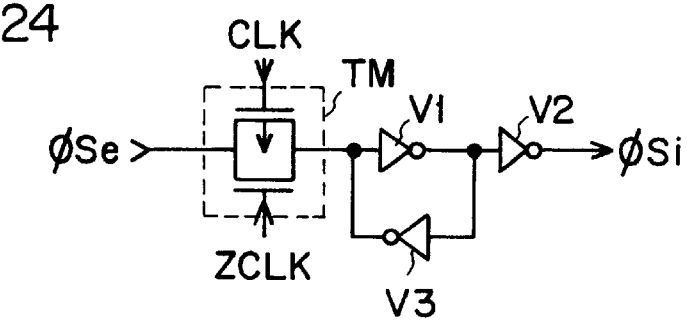
FIG. 24 is a diagram showing an exemplary structure of an input first stage of a driver circuit shown in FIG. 22.

FIG. 24 is a diagram showing an exemplary structure of an input stage in the driver circuits 210x to 210z shown in FIG. 22. Referring to FIG. 24, the driver circuit input stage includes a CMOS transmission gate TM made conductive in response to the trailing edge of the clock signal CLK for passing a control signal φSe supplied from the logic generation part, two stages of invertor circuits V1 and V2 transmitting an output signal of the CMOS transmission gate TM, and an invertor circuit V3 inverting an output signal of the invertor circuit VI for transmission to an input part of the invertor circuit V1. The invertor circuits V1 and V3 form a latch circuit. An internal control signal φSi is outputted from the invertor circuit V2.

In the structure shown in this FIG. 24, the CMOS transmission gate TM is in an OFF state and the internal control signal φSi maintains a precedent state when the clock signal CLK is at a high level. When the clock signal CLK falls to a low level, the CMOS transmission gate TM conducts, and the internal control signal φSi changes in accordance with the control signal φSe supplied from the logic generation part 211a. Thus, a driver circuit generating an internal control signal in synchronization with the trailing edge of the clock signal CLK is implemented.

As this driver circuit input stage shown in FIG. 24, a flip-flop utilizing a NAND circuit entering a through state in synchronization with the trailing edge of the clock signal CLK and entering a latch state in response to the leading edge of the clock signal CLK may be employed. Further, the CMOS transmission gate TM may be provided on an output part of the invertor circuit V2.

Figure 25:
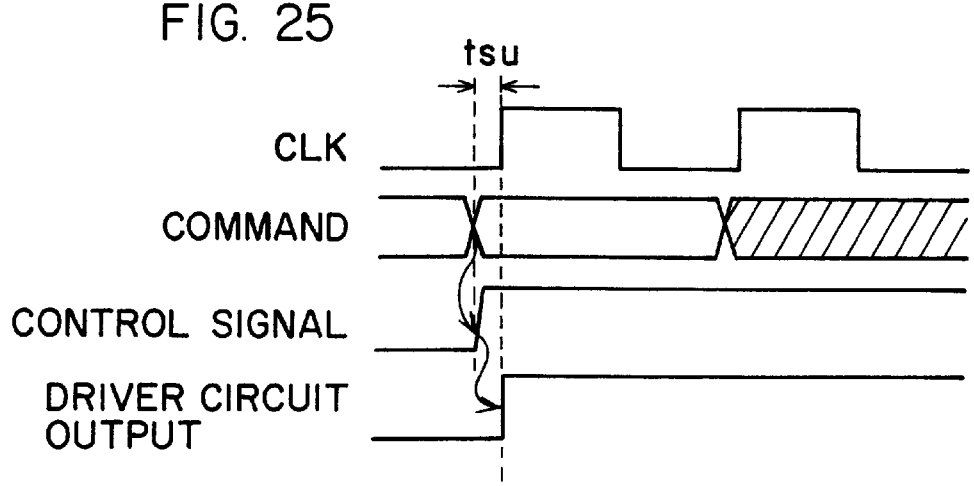
FIG. 25 is a diagram showing another operation sequence of the SRAM control part shown in FIG. 22.

FIG. 25 is a diagram showing a modification of the control signal generation sequence according to the embodiment 3 of the present invention. Referring to FIG. 25, the processor (CPU) issues a command which is brought into a definite state on the leading edge of the clock signal CLK. From the processor (CPU), therefore, the command is issued before a setup time tsu with respect to the leading edge of the clock signal CLK. This is identical to such a state that a command is brought into a definite state on the leading edge of a clock signal in a general clock synchronous memory, for example. In accordance with the issuance of this command, a control signal from the SRAM control logic generation part is brought into a definite state asynchronously with the clock signal CLK. This control signal is brought into a definite state at a timing earlier than the leading edge of the clock signal CLK. The driver circuits take in this control signal and generates an internal control signal in synchronization with the leading edge of the clock signal CLK.

By making the processor (CPU) issue a command which is brought into a definite state on the leading edge of the clock signal CLK as in the sequence shown in this FIG. 25, the driver circuits 210x to 210z (see FIG. 22) can generate the internal control signals at early timings without waiting for the trailing edge of the clock signal CLK, and a higher speed operation can be implemented.

Figure 26:
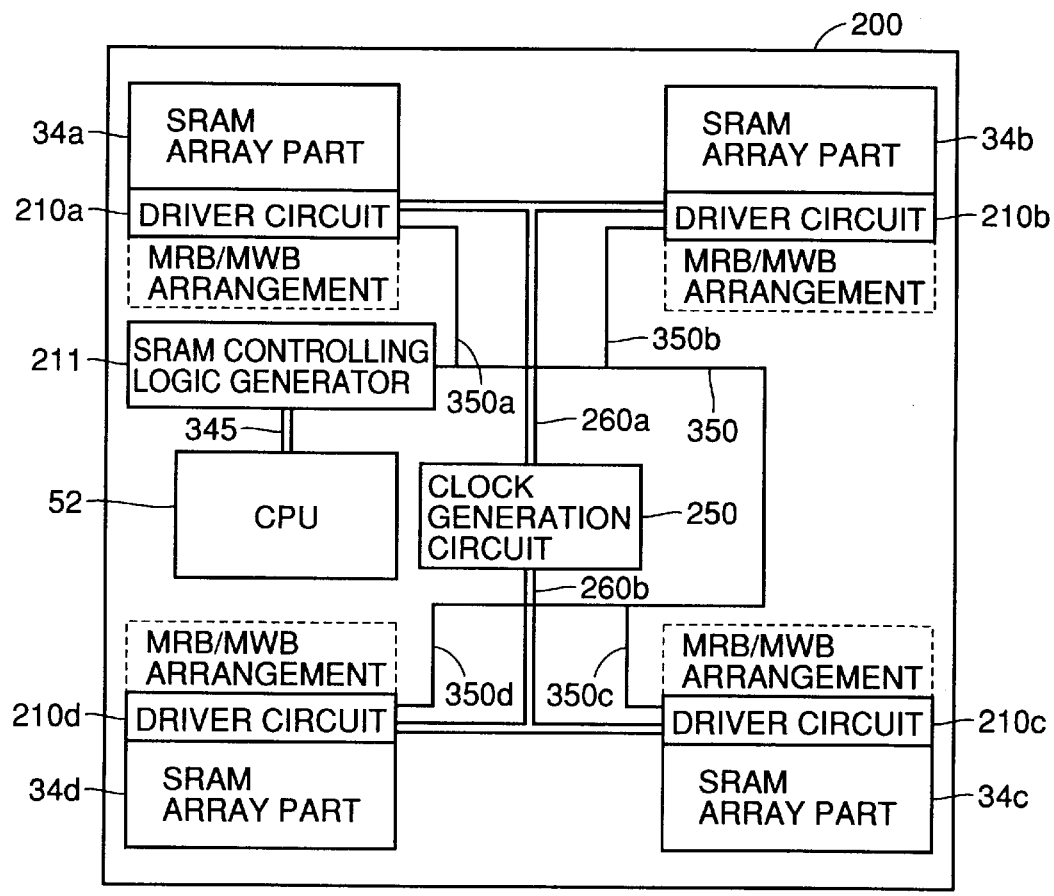
FIG. 26 is a diagram schematically showing the on-chip layout of the microcomputer according to the embodiment 3 of the present invention.

FIG. 26 is a diagram schematically showing an on-chip layout of the microcomputer according to the embodiment 3 of the present invention. FIG. 26 does not show the DRAM, the bus interface unit (BIU) and the first bidirectional transfer circuit part.

Referring to FIG. 26, the microcomputer includes the clock generation circuit 250 arranged on a central portion of a chip 200. The SRAM array parts 26a, 26b, 26c and 26d are dispersively arranged symmetrically about this clock generation circuit 250 (see the layout of FIG. 21). The driver circuits 210a to 210d are arranged in correspondence to the respective SRAM array parts 26a to 26d. Signal line lengths from the clock generation circuit 250 are made as short as possible. The processor (CPU) 52 is arranged on the central portion of the semiconductor chip 200 adjacently to the clock generation circuit 250, and the SRAM control logic generation part 210a included in the memory controller is arranged on a region close to this processor (CPU) 52.

A bus 345 is arranged between the processor (CPU) 52 and the SRAM control logic generation part 211a. The commands from the processor (CPU) 52 are transmitted onto this bus 345. The control signals from the SRAM control logic generation part 210a are transmitted through a bus 350. This bus 350 is arranged in a U shape enclosing the clock generation circuit 250 therein, and has branch parts of a bus 350a for supplying the control signals to the driver circuit 210a, a bus 350b for supplying the control signals to the driver circuit 210b, a bus 350c for supplying the control signals to the driver circuit 210c, and a bus 350d for supplying the control signals to the driver circuit 210d.

The clock signal from the clock generation circuit 250 is supplied to the driver circuits 210a and 210b through a clock signal line 260a, and supplied to the driver circuits 210c and 210d through a clock signal line 260b. In order to minimize signal propagation delay of the clock signal from the clock generation circuit 250, the widths of these clock signal lines 260a and 260b are made as large as possible, or alternatively a plurality of clock signal lines are arranged in parallel with each other, and the line widths thereof are equivalently widened. Due to this contrivance, interconnection line resistance of the clock signal lines 260a and 260b is made as small as possible.

The control signals for the driver circuits 210a to 210d may be brought into definite states at a transition time of this clock signal. To a control signal bus transmitting the control signals from SRAM control logic generation part 211a, therefore, no requirement for the control signals transmitted to the respective driver circuits 210a to 210d to simultaneously enter definite states is imposed. Therefore, this control signal bus 350 (350a to 350d) may not be subject to widening of the line width or reduction of the interconnection line resistance, the interconnection line width can be the necessary minimum line width, and this interconnection line layout area increase can be suppressed.

If the definite timings of the control signals from this SRAM control logic generation part 211a fall behind the change timing of the clock signal CLK, the timings for generating the control signals may be simply advanced as shown in FIG. 25. This is implemented by adjusting the command output timing of the processor (CPU) 52, or by making a contrivance of reducing gate delay in the SRAM control logic generation part 211a as much as possible. Also in such case, the line width of the control signal bus 350 may not be equivalently widened, but increase of the occupied area of this control signal bus can be suppressed. As timing control by interconnections, timing control for only the clock signal may be taken into consideration, and timing control for the remaining control signals may not be done by the layout of the interconnection lines. Thus, high-speed information transfer between the processor (CPU) and the SRAM can be implemented without layout area increase of the interconnection lines.

Second transfer circuits (MRB/MWB) are arranged opposing to the SRAM array parts 26a to 26d adjacently to the driver circuits 210a to 210d, as shown by broken line blocks. These driver circuits 210a to 210d generate the control signals for the SRAM, and hence also generate control signals determining transfer timings of these second bidirectional transfer circuits. Also as to the second bidirectional transfer circuits (MRB/MWB), the second bidirectional transfer circuits (MRB/MWB) arranged in correspondence to these SRAM array parts can be operated at the same timing when the SRAM array parts 26a to 26d are dispersively arranged, there is no need to take a margin for the transfer timing into consideration, and high-speed information transfer can be implemented.

According to the embodiment 3 of the present invention, as hereinabove described, the driver circuits generating the control signals driving the SRAM array parts are operated in synchronization with the clock signal and arranged in proximity to the respective SRAM array parts, whereby the respective SRAM array parts and the second bidirectional transfer circuits can be operated at the same timing, and a high-speed operation is implemented.

[Embodiment 4]

Figure 27:
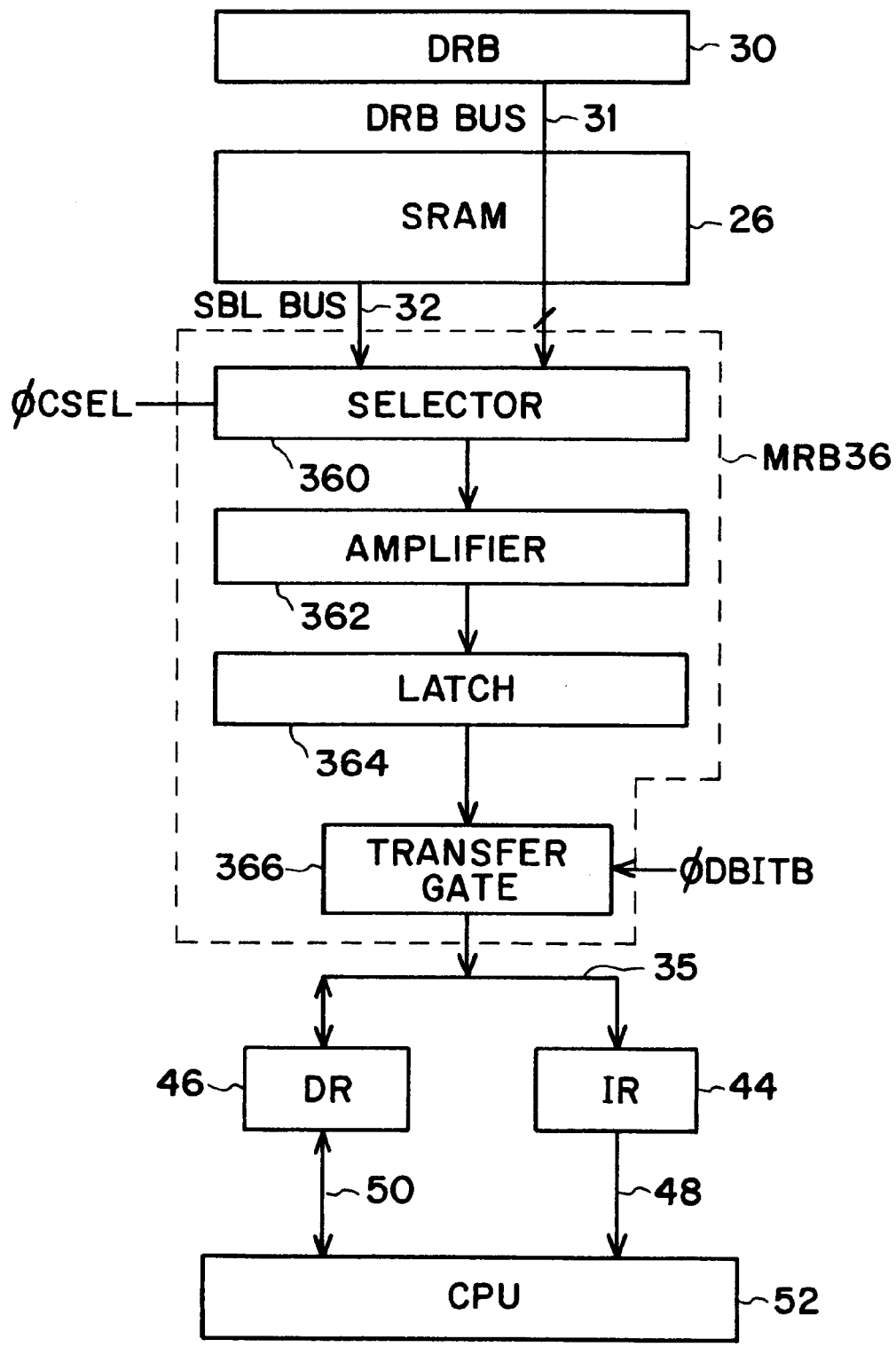
FIG. 27 is a diagram schematically showing the structure of a main part of a microcomputer according to an embodiment 4 of the present invention.

FIG. 27 is a diagram showing the structure of a main part of a microcomputer according to an embodiment 4 of the present invention. Referring to FIG. 27, a DRAM read buffer (DRB) 30 and a memory read buffer (MRB) 36 which are arranged opposingly on both sides of an SRAM 26 are interconnected with each other through a DRB bus 31 which in turn is arranged on an upper layer of this SRAM 26. This memory read buffer (MRB) 36 receives information on an SBL bus 32 connected to the SRAM 26.

The memory read buffer (MRB) 36 includes a selector 360 selecting one of the SBL bus 32 and the DRB bus 31 in accordance with a selection control signal φCSEL, an amplifier 362 amplifying a signal on the bus selected by the selector 360, a latch 364 latching the signal amplified by the amplifier 362, and a transfer gate 366 activated in response to a transfer instruction signal φDBITB for transferring the signal latched by the latch 364 onto an ITB bus 35.

This ITB bus 35 is connected to a data register (DR) 46 and an instruction register (IR) 44. The data register (DR) 46 and the instruction register (IR) 44 are connected to a processor (CPU) 52 through buses 50 and 48 respectively.

In the structure shown in this FIG. 27, a transfer gate or a transfer buffer (see FIG. 13) provided to a portion on the SBL bus 32 and the DRB bus 31 is not shown. The structure shown in this FIG. 27 is equivalent to a combination of the embodiments 1 and 2. By selecting one of the SBL bus 32 and the DRB bus 31 by the selector 360, an amplifier amplifying information on the SBL bus 32 and an amplifier amplifying an output signal of the memory read buffer (MRB) 36 can be made common, and the circuit occupying area can be reduced.

The specific structure of the memory read buffer (MRB) 36 shown in this FIG. 27 is equivalent to the structure shown in FIG. 15. The selector 360 and the amplifier 362 correspond to the selection latch 66, and the latch 364 and the transfer gate 366 correspond to the amplifier 68. Alternatively, such a structure that one of the SBL bus and the DRB bus is selected by the selector and coupled to an amplifier circuit 66a (or 66b) and the resultant amplified data is latched by a latch circuit 66c may be employed (see FIG. 15) in the selection latch 66.

[Modification]

Figure 28:
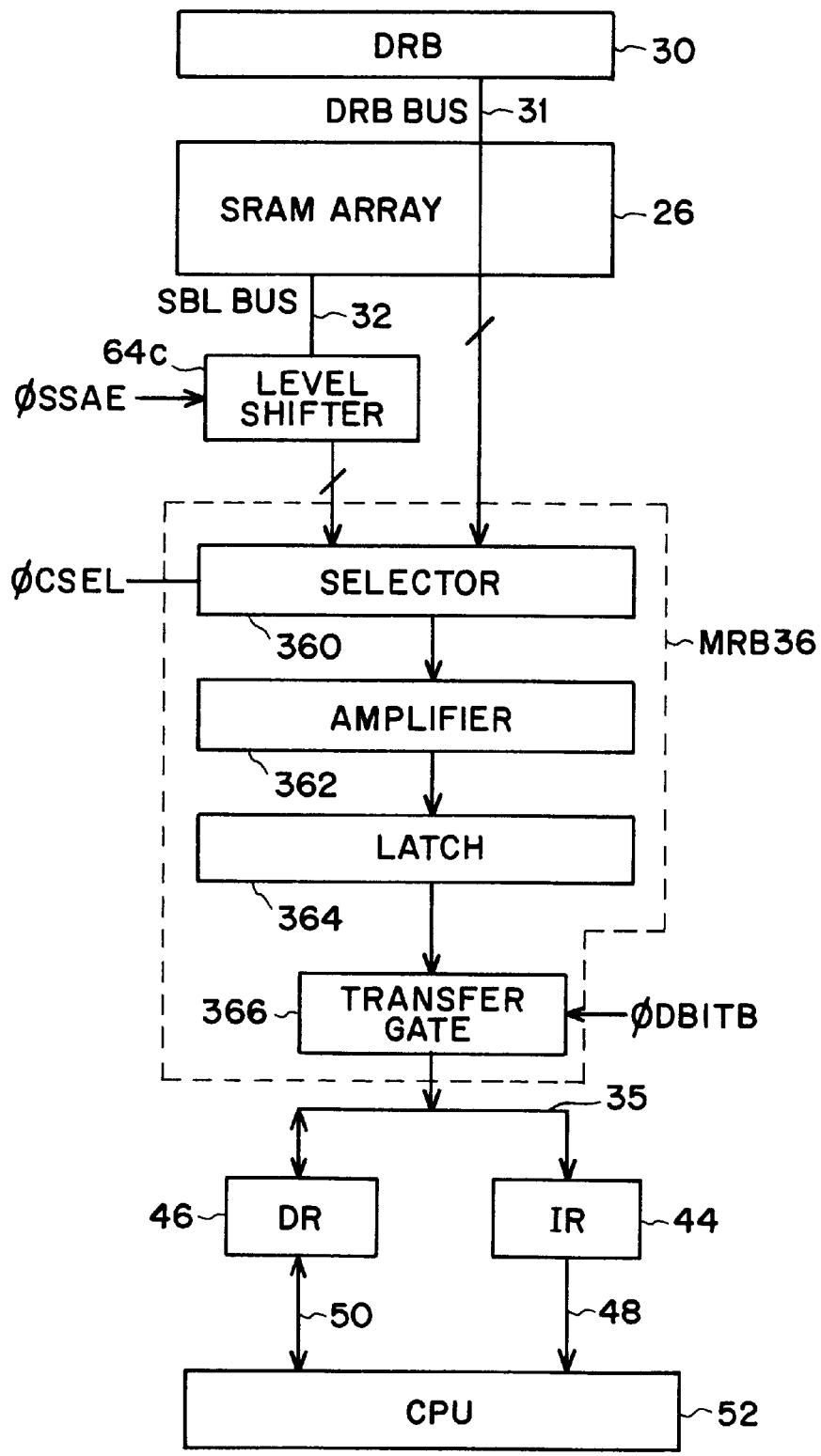
FIG. 28 is a diagram schematically showing the structure of a modification of the embodiment 4 of the present invention.

FIG. 28 is a diagram showing the structure of a modification 1 of the embodiment 4 of the present invention. Referring to FIG. 28, a level shifter 64c which is activated in response to an SRAM transfer activation (enable) signal φSSAE for holding a signal potential on an SBL bus 32 and supplying the same to a selector 360, is provided on the SBL bus 32. This level shifter 64c has the same structure as the level shifter shown in FIG. 19 (this level shifter 64c has the structure shown in FIG. 19 by 128). The remaining structure is identical to the structure shown in FIG. 27, the same reference numerals are applied to corresponding parts, and detailed description thereof is omitted.

In the structure shown in this FIG. 28, the level shifter 64c is provided on the SBL bus 32, whereby signals can be transmitted to an amplifier 362 through the selector 360 with no signal loss in transfer of the signals to the SBL bus 32, and high-speed amplification can be implemented.

Also in the structure shown in FIG. 28, a transfer buffer in a DRB bus 31 is not shown, in order to simplify the figure. A transfer gate (64b; see FIG. 18) between the SBL bus 32 and the level shifter 64c is not shown either.

The selector 360 may be a switching circuit, or a tri-state buffer brought into an output high impedance state in inactivation thereof may be employed. Further, the selector 360 and the amplifier 362 may be implemented by one circuit as shown in FIG. 15.

According to the embodiment 4 of the present invention, as hereinabove described, the amplifier amplifying the information signals transmitted over the DRB bus and the information signals transmitted through the SBL bus 32 are implemented by the same amplifier, whereby the circuit occupied area can be reduced.

While the present invention has been described in detail, the present invention is not restricted to the aforementioned embodiments. While the description has been made on the assumption that the external data bus is 16 bits in width, the BIU bus is of 32 bits and the internal buses (the GIO buses, the ITB bus and the SBL bus) each are of 128 bits and the CPU bus (the IR buses and the DR buses) is of 32 bits (64 bits in total), these bit numbers are arbitrary, and the widths (bit widths) of these buses are properly set at appropriate values depending on the application in which the microcomputer according to the present invention is employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microcomputer formed on a chip, comprising:
   a data input/output pad;
   bus interface circuitry connected to said data input/output pad through a first bus for making an interface for inputting and outputting an information signal through said data input/output pad;

a first memory connected with said bus interface circuitry through a second bus for performing transfer of an information signal including data and an instruction with said bus interface circuitry;

first bidirectional transfer circuitry with a latch function of latching an applied signal, and connected to said first memory through a third bus for bidirectionally transferring at least data with said first memory;

second bidirectional transfer circuitry with a latch function of latching an applied signal, and connected with said first bidirectional transfer circuitry through a fourth bus for transferring at least data bidirectionally at least with said first bidirectional transfer circuitry;

a second memory connected with said second bidirectional transfer circuitry through a fifth bus for performing transfer of an information signal with said second bidirectional transfer circuitry; and processor circuitry connected with said second bidirectional transfer circuitry through a sixth bus for performing transfer of an information signal with said second bidirectional transfer circuitry, executing an instruction included in the information signal and transmitting data of a result of execution to said sixth bus.

2. The microcomputer in accordance with claim 1, wherein said first bidirectional transfer circuitry includes:

a first read buffer circuit for latching an information signal supplied on said third bus for transference to said second bidirectional transfer circuitry, and a first write buffer circuit for latching an information signal transferred from said second bidirectional transfer circuitry for transmission onto said third bus, said second bidirectional transfer circuitry includes:

a second read buffer circuit for selectively latching an information signal supplied from said first read buffer circuit through said fourth bus and said second memory for transference to said sixth bus, and a second write buffer circuit for latching an information signal supplied through said sixth bus and for selectively transferring the latched information signal to said first write buffer circuit and said fifth bus, and a bus between said second read buffer circuit and said first read buffer circuit and a bus between said second write buffer circuit and said first write buffer circuit are provided separately from each other.

3. The microcomputer in accordance with claim 2, wherein said second read buffer circuit includes means for amplifying and transferring latched information signal.

4. The microcomputer in accordance with claim 1, wherein said second bidirectional transfer circuitry is arranged between said second memory and said processor circuitry.

5. The microcomputer in accordance with claim 4, wherein said first memory is arranged between said bus interface circuitry and said first bidirectional transfer circuitry, and said first bidirectional transfer circuitry is arranged between said first memory and said second memory.

6. The microcomputer in accordance with claim 4, wherein said fourth bus is arranged extending over said second memory, said first bidirectional transfer circuitry and said second bidirectional transfer circuitry are arranged opposing each other with respect to said second memory.

7. The microcomputer in accordance with claim 1, wherein said bus interface circuitry includes a plurality of subbus interface circuits containing therebetween said processor circuitry, said first memory, said second memory, said first bidirectional transfer circuitry and said second bidirectional transfer circuitry dispersively on a peripheral portion of said chip.

8. The microcomputer in accordance with claim 1, wherein the first to sixth buses are provided separately from each other.

9. The microcomputer in accordance with claim 1, wherein a bus width of said first bus is smaller than a bus width of said second bus.

10. The microcomputer in accordance with claim 1, wherein said bus interface circuitry includes first selection transfer circuitry for latching an information signal supplied through said second bus and selectively outputting the latched information signal to said first bus, and second selection transfer circuitry including latch circuits of a number equal to a bus width of said second bus, for selectively latching an information signal supplied through said first bus in said latch circuits, and outputting the latched information signal to said second bus.

11. The microcomputer in accordance with claim 1, wherein said second memory includes a plurality of memory units symmetrically arranged dispersively on said chip, and wherein said microcomputer further comprises:

a plurality of control signal generation means arranged in proximity to the respective plurality of memory units for generating control signals controlling operations of the corresponding memory units.

12. The microcomputer in accordance with claim 1, wherein said second memory includes a plurality of memory units arranged on said chip, and wherein said microcomputer further comprises:

clock signal generation circuitry arranged on a portion of said chip in the center of said plurality of memory units, for generating a clock signal, control signal generation circuitry for decoding a command from said processor circuitry to generate a control signal for controlling an operation of at least said second memory in accordance with a result of decoding, and a plurality of drive circuits arranged in proximity to the respective memory units, for taking in said control signal in synchronization with said clock signal and driving corresponding memory units in accordance with the taken in control signal wherein said plurality of memory units are symmetrically dispersed with respect to said clock signal generation circuitry.

13. The microcomputer in accordance with claim 12, wherein said second bidirectional transfer circuitry comprises a plurality of bidirectional transfer buffer circuits arranged in correspondence to the respective memory units, and each of said plurality of drive circuits is arranged between a corresponding memory unit and a corresponding bidirectional transfer buffer circuit.

14. The microcomputer in accordance with claim 1, wherein said second bidirectional transfer circuitry includes:

a selector circuit receiving an information signal transferred from said first bidirectional transfer circuitry and an information signal read from said second memory for selectively transmitting the received information signals, and an amplifier circuit for amplifying an information signal from said selector circuit for transmission to said sixth bus.

15. The microcomputer in accordance with claim 1, further comprising:

a clock generation circuit generating a clock signal, control signal generation circuitry operating independently of said clock signal, for decoding a command from said processor circuitry to operate said second memory in accordance with a result of decoding, and driver circuitry arranged between said second bidirectional transfer circuitry and said second memory in proximity to said second memory for driving said second memory in synchronization with said clock signal and in accordance with a control signal from said control signal generation circuitry.

16. The microcomputer in accordance with claim 1, wherein said processor circuitry includes:

a processor executing a supplied instruction and forming data representing a result of execution, an instruction register connected between said processor and said sixth bus for latching an instruction included in an information signal on said sixth bus for transference to said processor, and a data register including means for latching and transferring a supplied data signal and connected between said processor and said sixth bus.

17. The microcomputer in accordance with claim 16, wherein said instruction register includes:

latches of a number equal to a bus width of said sixth bus, and a selection circuit for selectively transferring an information signal latched by said latches to said processor, and said data register includes:

data latches of a number equal to a bus width of said sixth bus, and data selection circuit for selectively connecting said data latches to said processor.

18. The microcomputer in accordance with claim 16, wherein a bus width of a bus between said data register and said processor is smaller than the bus width of said sixth bus and a bus width of a bus between said instruction register and said processor is smaller than the bus width of said sixth bus.

19. The microcomputer in accordance with claim 16, wherein each of said bus interface circuitry, said first memory, said first bidirectional transfer circuitry, said second memory, said second bidirectional transfer circuitry, said instruction register and said data register includes a plurality of subunits mirror-symmetrically arranged with respect to said processor.

\* \* \* \* \*